United States Patent
Starbuck et al.

(10) Patent No.: US 10,970,778 B1
(45) Date of Patent: Apr. 6, 2021

(54) SYSTEM AND METHOD FOR USING A FINANCIAL SERVICES WEBSITE

(71) Applicant: JPMorgan Chase Bank, N.A., New York, NY (US)

(72) Inventors: Richard Starbuck, West Creek, CA (US); Brian Okelley, Berkeley, CA (US); Anthony David Guido, Corona, CA (US)

(73) Assignee: JPMorgan Chase Bank, N. A., New York, NY (US)

( * ) Notice: Subject to any disclaimer, the term of this patent is extended or adjusted under 35 U.S.C. 154(b) by 752 days.

(21) Appl. No.: 13/799,308

(22) Filed: Mar. 13, 2013

(51) Int. Cl.
*G06Q 40/02* (2012.01)

(52) U.S. Cl.
CPC .................................. *G06Q 40/02* (2013.01)

(58) Field of Classification Search
CPC ...... G06Q 40/025; G06Q 40/00; G06Q 40/02; G06Q 20/10; G06Q 20/102; G06Q 20/40; G06Q 30/02; G06Q 40/04; G06Q 30/04; G06Q 30/06
USPC .............................................. 705/44, 35–41
See application file for complete search history.

(56) References Cited

U.S. PATENT DOCUMENTS

| | | | |
|---|---|---|---|
| 5,889,863 A | 3/1999 | Weber | |
| 6,607,136 B1 | 8/2003 | Atsmon et al. | |
| 6,886,046 B2 | 4/2005 | Stutz et al. | |
| 7,010,512 B1 | 3/2006 | Gillin et al. | |
| 7,225,249 B1 | 3/2007 | Barry et al. | |
| 7,578,438 B2 | 8/2009 | Hogg et al. | |
| 7,627,531 B2 | 12/2009 | Breck et al. | |
| 7,685,037 B2 | 3/2010 | Reiners et al. | |
| 7,814,005 B2 | 10/2010 | Imrey et al. | |
| 7,848,978 B2 | 12/2010 | Imrey et al. | |
| 8,027,879 B2 | 9/2011 | Ramer et al. | |
| 8,280,773 B2 | 10/2012 | Srinivasan et al. | |
| 8,606,708 B1 * | 12/2013 | Homier | G06Q 40/02 705/40 |
| 8,626,658 B1 * | 1/2014 | Kapulkin | G06Q 40/02 705/42 |
| 9,779,457 B1 * | 10/2017 | Fisher | G06F 3/04817 |
| 2002/0052778 A1 | 5/2002 | Murphy et al. | |
| 2002/0064149 A1 | 5/2002 | Elliott et al. | |
| 2002/0111859 A1 | 8/2002 | Sheldon et al. | |

(Continued)

FOREIGN PATENT DOCUMENTS

WO     WO 01118656     3/2001

OTHER PUBLICATIONS

Kim, Jane J. "A Better Online Bank; Financial Firms Add Services and Beef Up the Security", Wall Street Journal, Eastern edition [New York. N.Yj Nov. 18, 2006: 3.1.*

*Primary Examiner* — Hani M Kazimi
(74) *Attorney, Agent, or Firm* — Hunton Andrews Kurth LLP

(57) ABSTRACT

Exemplary embodiments include a website for a financial institution that has a number of new features for users including: an action tray; "bring it to me" type navigation; a tile view for account information; simplified and homogenous navigation; a unified inbox for messages; and a returning customer log-in page. Accordingly, the website has a number of innovative features to enhance the user experience and streamline navigation of the website. The website can be used to conduct financial transactions as well as interface with the financial institution.

18 Claims, 24 Drawing Sheets

(56) References Cited

U.S. PATENT DOCUMENTS

| | | |
|---|---|---|
| 2002/0128981 A1 | 9/2002 | Kawan et al. |
| 2002/0161630 A1 | 10/2002 | Kern et al. |
| 2004/0031856 A1 | 2/2004 | Atsmon et al. |
| 2005/0066037 A1 | 3/2005 | Song et al. |
| 2005/0086166 A1 | 4/2005 | Monk et al. |
| 2005/0216421 A1 | 9/2005 | Barry et al. |
| 2006/0085330 A1 | 4/2006 | Imrey et al. |
| 2006/0085331 A1 | 4/2006 | Imrey et al. |
| 2006/0085332 A1 | 4/2006 | Imrey et al. |
| 2006/0106678 A1* | 5/2006 | Walker ............... G06Q 30/0283 705/51 |
| 2006/0277103 A1 | 12/2006 | Fujita et al. |
| 2007/0043681 A1 | 2/2007 | Morgan et al. |
| 2007/0226053 A1 | 9/2007 | Carl et al. |
| 2008/0065565 A1* | 3/2008 | Walker ............... G06Q 30/0283 705/400 |
| 2008/0091528 A1 | 4/2008 | Rampell et al. |
| 2008/0313205 A1 | 12/2008 | Elgar et al. |
| 2008/0320567 A1 | 12/2008 | Shulman et al. |
| 2009/0222348 A1 | 9/2009 | Ransom et al. |
| 2010/0212002 A1* | 8/2010 | Michener et al. ................ 726/7 |
| 2010/0250357 A1 | 9/2010 | Kim |
| 2011/0106597 A1 | 5/2011 | Ferdman et al. |
| 2011/0258070 A1 | 10/2011 | Lynch et al. |
| 2011/0276627 A1* | 11/2011 | Blechar ................ G06F 21/41 709/203 |
| 2012/0239417 A1 | 9/2012 | Pourfallah et al. |
| 2012/0330769 A1* | 12/2012 | Arceo ............................ 705/21 |
| 2014/0040002 A1* | 2/2014 | Walker ................ G06Q 20/12 705/14.26 |
| 2014/0236792 A1* | 8/2014 | Pant ...................... G06Q 40/02 705/35 |
| 2016/0247188 A1* | 8/2016 | Zhou ................... G06F 16/9535 |

* cited by examiner

BANK | Personal | Business | Commercial | This information is for #### | Locations | Contact Us | 🔒Log Out
BANK SYMBOL
How can we help you today? ⌄

🔒Your Accounts | Activity ⌄ | Products & Services | Why Bank? | Profile & Settings ⌄ | Documents & Messages ⌄ | Last login: Yesterday at 5:43 pm | ☐History Overview | Activity ⌄ | Pay & Transfer | ...

Hi Pat, welcom... action items... — 710 — Hide action items ▲

Pay Bills & Invoices ›
Transfer Money ›
Person to Person ›

Quick Pay ›
Wire Transfer ›
Overnight Check ›
[Transfer money]

Low Balance A...
Yesterday at 6:12 pm
My Bank Checking (...2233) is below your...
[Remind me in... ▼] [Recent Activity] [Alert Settings]

☒ Low Balance Alert from Checking
☒ Due in 7 days, payment of $110 from AAA
☒ Problem with Check #1020, funds low See more messages »

Checking ⊙▫
Available Balance
$851.54

Credit Card
Outstanding Balance
$1,948.19

Savings
Available Balance
$1,100.54

Joint Bank Savings
Available Balance
$849.37

Rewards Program
Available
15,100

Bank CD
Balance
$10,019.67

Personal | Business | Commercial

BANK [BANK SYMBOL]

This information is for #### | Locations | Contact Us | 🔒 Log Out

*How can we help you today?* ▾

🔒 Your Accounts | Products & Services | Why Bank?

Overview | Activity ▾ | Pay & Transfer ▾ | Profile & Settings ▾ | Documents & Messages — *714*

- Inbox
- Statements
- Checking Images
- Deposits
- Alerts & Notifications
- Messages
- Offers
- Forms & Documents ›

Last login: Yesterday at 5:43 pm | ☐ History

Hi Pat, welcome back. You have 4 action items ◢ Hide action items

Low Balance Alert, $142.93
Yesterday at 6:12 pm
My Bank Checking (...2233) is below your $250 threshold

[ Remind me in... ▾ ] [ Recent Activity ] [ Alert Settings ]

☒ Low Balance Alert from Checking
☒ Due in 7 days, payment of $110 from AAA
☒ Problem with Check #1020, funds low See more messages »

Checking 💰
Available Balance
$851.54

Savings
Available Balance
$1,100.54

Joint Bank Savings
Available Balance
$849.37

Credit Card
Outstanding Balance
$1,948.19

Rewards Program
Available
15,100

Bank CD
Balance
$10,019.67

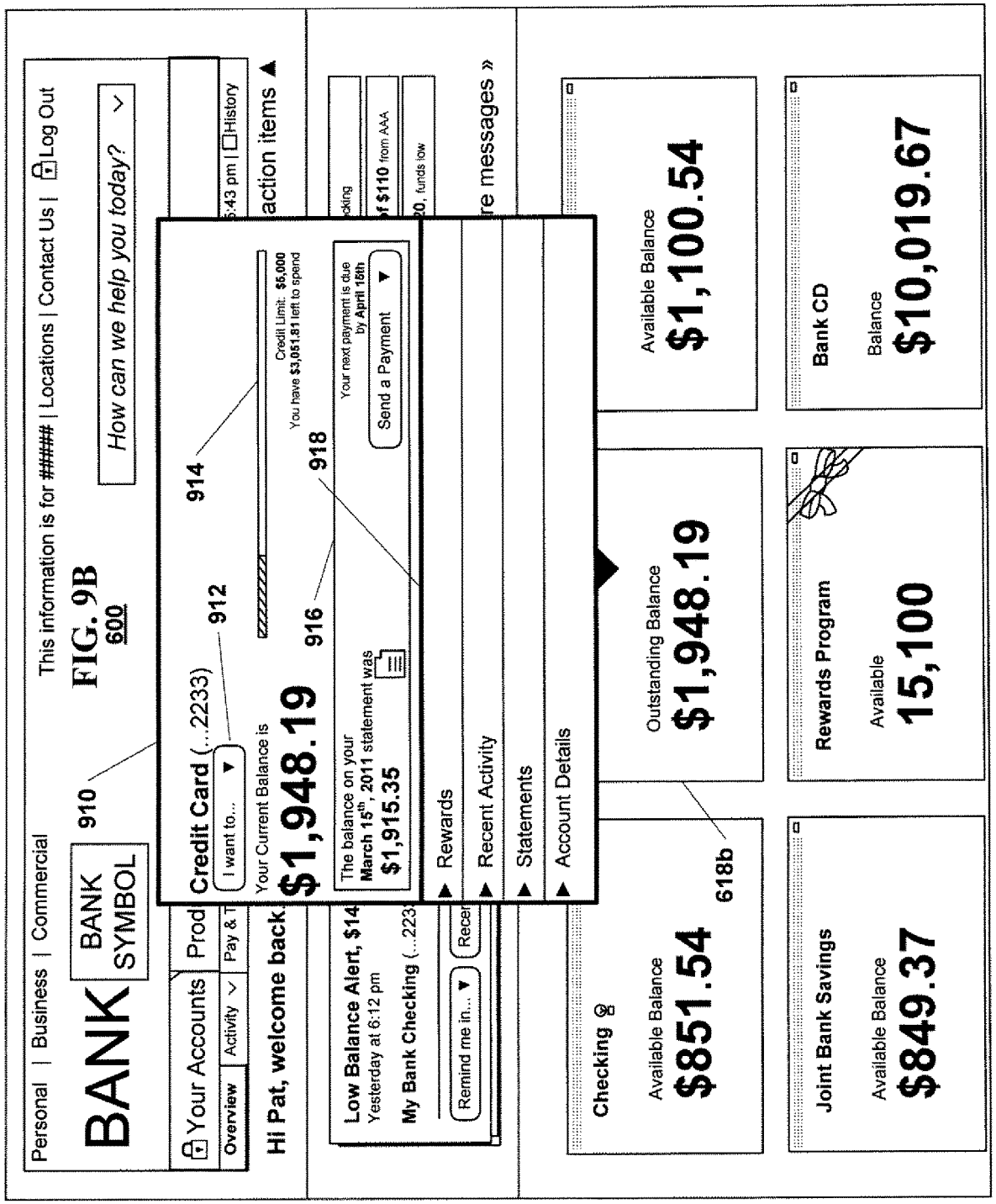

FIG. 9D

SYSTEM AND METHOD FOR USING A FINANCIAL SERVICES WEBSITE

FIELD OF THE INVENTION

The invention relates generally to providing financial services, such as through the Internet using a website that is designed to optimize the user's experience.

BACKGROUND OF THE INVENTION

The Internet allows customers of financial institutions to conduct transactions with the financial institution from the convenience of a remote computer terminal or computing device. However, many financial institution websites lack a standard layout between pages and are not user friendly.

These and other deficiencies exist.

SUMMARY OF THE INVENTION

Exemplary embodiments include a computer implemented system. The system includes: a server comprising at least one processor; and a memory comprising computer-readable instructions which when executed by the at least one processor cause the at least one processor to perform the steps comprising: receiving a first request from a computer terminal by a user for a first webpage that is associated with a financial institution; providing the first webpage which comprises a section for input of login information associated with the user; receiving the login information from the first webpage; providing a secure webpage following a validation of the login information, the secure webpage differing from the first webpage; receiving a logout request from the secure webpage; receiving a second request from the computer terminal for the first webpage; and providing a second webpage in response to the second request from the computer terminal, wherein the second webpage comprises a section requiring a subset of the login information and the second webpage differs from the first webpage.

Exemplary embodiments include a computer implemented method. The method includes: receiving a first request from a computer terminal by a user for a first webpage that is associated with a financial institution; providing, by at least one computer processor, the first webpage which comprises a section for input of login information associated with the user; receiving the login information from the first webpage; providing, by the at least one computer processor, a secure webpage following a validation of the login information, the secure webpage differing from the first webpage; receiving a logout request from the secure webpage; receiving a second request from the computer terminal for the first webpage; and providing, by the at least one computer processor, a second webpage in response to the second request from the computer terminal, wherein the second webpage comprises a section requiring a subset of the login information and the second webpage differs from the first webpage.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

For the purposes of illustrating exemplary embodiments, there is shown in the drawings a form which is presently preferred, it being understood however, that the embodiments are not limited to the precise form shown by the drawing in which:

FIG. 5B is a depiction of the login webpage showing menu options according to exemplary embodiments.

FIG. 7A is a depiction of the secure home webpage showing menu options according to exemplary embodiments.

FIG. 7C is a depiction of the secure home webpage showing menu options according to exemplary embodiments.

FIG. 7D is a depiction of the secure home webpage showing menu options according to exemplary embodiments.

FIG. 7F is a depiction of the secure home webpage showing menu options according to exemplary embodiments.

FIG. 9B is a depiction of a second embodiment of a pop-up account information window for a financial institution website according to exemplary embodiments.

FIG. 9D is a depiction of a fourth embodiment of a pop-up account information window for a financial institution website according to exemplary embodiments.

DETAILED DESCRIPTION OF THE PREFERRED EMBODIMENTS

Figure 1:
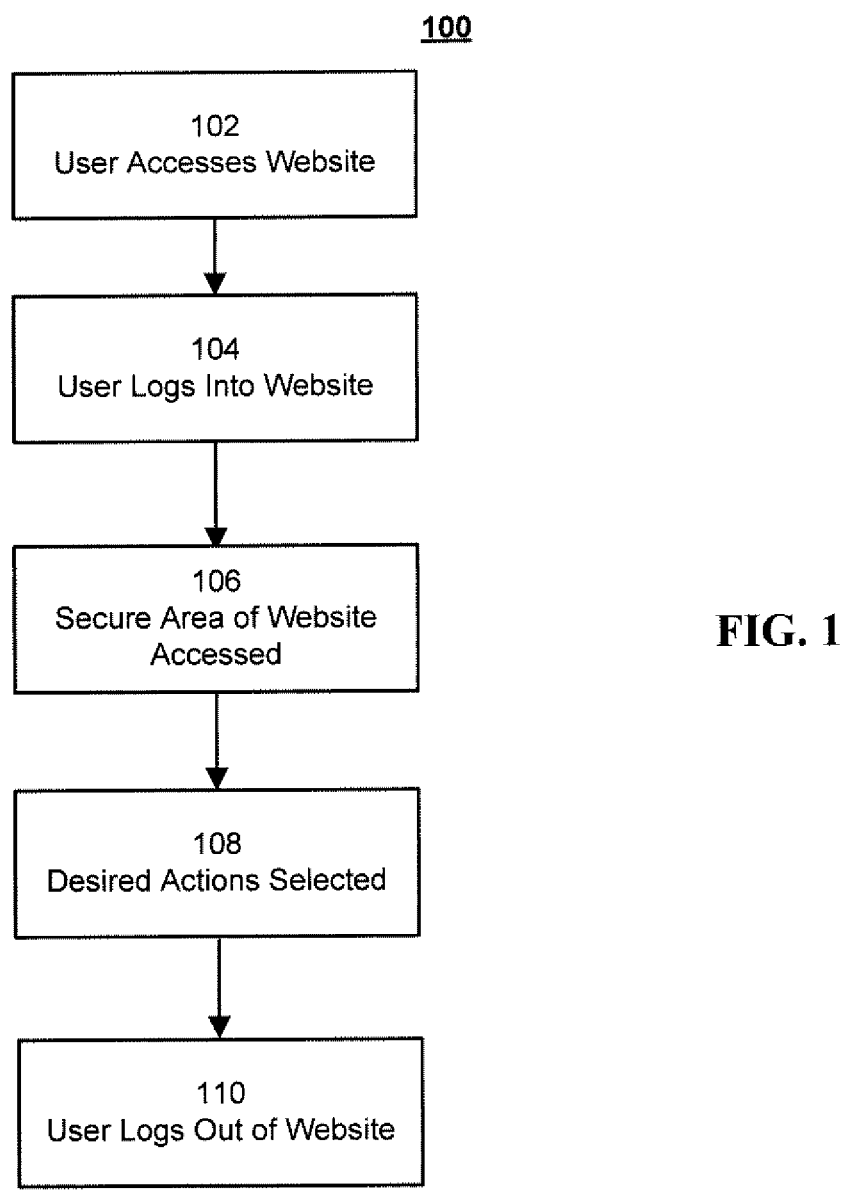
FIG. 1 is a flow chart of a method of using a financial institution website according to exemplary embodiments.

It will be readily understood by those persons skilled in the art that the embodiments of the inventions described herein are capable of broad utility and application.

Accordingly, while the invention is described herein in detail in relation to the exemplary embodiments, it is to be understood that this disclosure is illustrative and exemplary of embodiments of the invention and is made to provide an enabling disclosure of the invention. Accordingly, the disclosure is not intended to be construed to limit the embodiments of the invention or otherwise to exclude any other such embodiments, adaptations, variations, modifications and equivalent arrangements. While the various embodiments of the present invention are described in the context of financial transaction/services and providing of financial service through a website, the methods and systems described herein may be applied to other related services involving interaction with financial institutions.

The following descriptions are provided of different configurations and features according to exemplary embodiments. These configurations and features may relate to providing financial services through a website over a computer network, such as the Internet. While certain nomenclature and types of applications/hardware are described, other names and application/hardware usage is possible and the nomenclature provided is done so by way of non-limiting examples only. Further while particular embodiments are described, it should be appreciated that the features and functions of each embodiment may be combined in any combination as is within the capability of one of ordinary skill in the art. The attached Figures provide additional details regarding the present invention. It should also be appreciated that these exemplary embodiments are provided as non-limiting examples only.

Exemplary embodiments include a website for a financial institution. The use of the term financial institution is meant to include all types of providers of financial services, including, but not limited to, banks, credit unions, investment banks, and investment services. These entities may have a physical presence, a virtual presence, or both.

According to exemplary embodiments, the website has a number of new features over existing financial institution websites, including: an action tray; "bring it to me" type navigation to minimize the number of webpages presented; a tile view for account information; simplified and homogenous navigation between sections; a unified inbox for messages; and a returning customer log-in page.

Accordingly, the new website has a number of innovative features to enhance the user experience. An effort has been made to "clean-up" the user interface as well as break the "page paradigm" to convey requested information to the user. The majority of information is conveyed to the user through "bring it to me" type navigation through the use of pop-ups, frames, and the use of space on the existing page to streamline navigation; thus, rather than directing the user to a separate page when a link is actuated, the user is presented the information on the page they are on. An action tray is provided that can be viewed or hidden and provides a summary of important alerts to the user at the top portion of the website. The action tray further allows the user to take appropriate actions in response to the alert. A customizable tile based view allows account information to be quickly conveyed to the user on the status of their financial accounts on a single page. A common inbox allows the user to access all of the alerts and messages sent to the user by the financial institution. The common inbox has a filter to allow views by account and/or document type to segregate the information presented in the inbox. A returning customer log-in page eliminates clutter for returning customers and allows for presentation of a personalized experience for the returning customer, including identification by name of the customer, only having to enter a password to log-in to the secure website, and presentation of targeted media to the returning customer. Thus, the returning customer is provided with a streamlined log-in process as well as relevant information from the financial institution.

FIG. 1 depicts a flow chart of a method of using a website according to exemplary embodiments of the invention. Exemplary method 100 is provided by way of example, as there are a variety of ways to carry out the methods disclosed herein. The method 100 may be executed or otherwise performed by one or a combination of various systems, such as a computer implemented system. Each block shown in FIG. 1 represents one or more processes, methods, and/or subroutines carried out in the exemplary method 100. Each block may have an associated processing machine or the blocks depicted may be carried out through one processor machine.

The method 100, according to exemplary embodiments, given that is concerns a website is carried out "on-line" over a computer based network, such as, for example, the Internet. It should be appreciated that other computer based networks may be used. For example, the method 100 may be carried out over a computer based network associated with a financial institution that differs from the Internet.

At block 102, a user accesses a website. As described above, the website may be accessed through the Internet or another computer based network. The website may be accessed by typing an address or uniform resource locator (URL) into the address bar of a web browser. A computing device is necessary for this operation. The computing device may be connected to the Internet or other computer based network. Once accessed, the user is presented with a webpage corresponding to the URL entered. The webpage presented may be the home page of the website. According to exemplary embodiments, the website is associated with a financial institution. For example, the website may be the website or portal through which a customer can interact with and conduct transactions with the financial institution.

At block 104, the user logs into the website. As noted above, the website is associated with a financial institution. Accordingly, the website may have secure features to enable the user to conduct financial transactions, on-line, securely through the website. The log-on may require a username and password. It should be appreciated that other log-on techniques may be used, such as abbreviated log-in procedures for returning users, card based log-ins, and/or biometrics. Through the log-on process, the user's identity may be verified by the financial institution. As successful verification may confirm the user's identity as a customer of the financial institution. The user may be a customer because they have one or more accounts with the financial institution or have an established relationship with the financial institution and have configured a username/password or other identity credentials to log into the website.

In some embodiments, the user may not be a customer of the financial institution. The user may be looking for information about the financial institution or its products.

Accordingly, the user who is not a customer may not be able to access the secure areas of the website. However, such a user may still be able to access certain links which present information related to the financial institution.

At block 106, the secure area is accessed. Following a successful login and verification of the user's identity, the user may be taken to the secure area of the website. In the secure area, the user may be presented with information related to their accounts with the financial institution. The secure area may be fronted by a home webpage. This home webpage may be the main screen from which other actions or transactions may be initiated relating to the user's accounts. Information and various options for actions may be presented to the user through a variety of formats including menus, fly-out menus, pop-up windows, rollover windows, frames, etc. The secure area may be configured to attempt to provide all information requested by the user on the one webpage to simplify navigation and prevent the user from have to go between a number of webpages. Furthermore, as stated, the area may be secure to allow the conduct of financial transactions and the presentation of information to the customer.

Furthermore, the user may be presented with options, such as through an account information menu, of customizing the layout of the secure area webpage. Thus, the secure home webpage may be customizable by the user. Some options on the webpage may be grayed out or not selectable. For example, the user may not a have a credit card or a checking account. The options from particular drop down menus or interfaces relating to those types of accounts may be grayed out indicating the options are not available. When these options have the cursor placed over them or otherwise interacted with, a pop-up window may appear informing the user that this option is not available but the user may obtain this option. The user may be asked if they would like more information on this option, and a pop-up window may appear with information about that option which provides more information and provides the user with the ability to sign up for the option. For example, as depicted in the following figures, such as FIGS. 3A-3B, 4A-4B, and 5A-5C, the webpage may have a lower section in which information may be displayed, such as advertisements and other media. The aforementioned information may be displayed in this section. In some embodiments, the information relating to the option may be displayed upon the user placing their cursor over the grayed out option or otherwise attempting to interact with the option.

At block 108, the user selects desired actions. Upon selection of a particular action, such as by selecting an option from a menu, the requested action is performed or further information is presented to the user to continue with the action.

At block 110, upon completion of the desired actions, the user logs out. Upon log out, the user is directed from the secure area back to the log-in screen or homepage.

Figure 2:
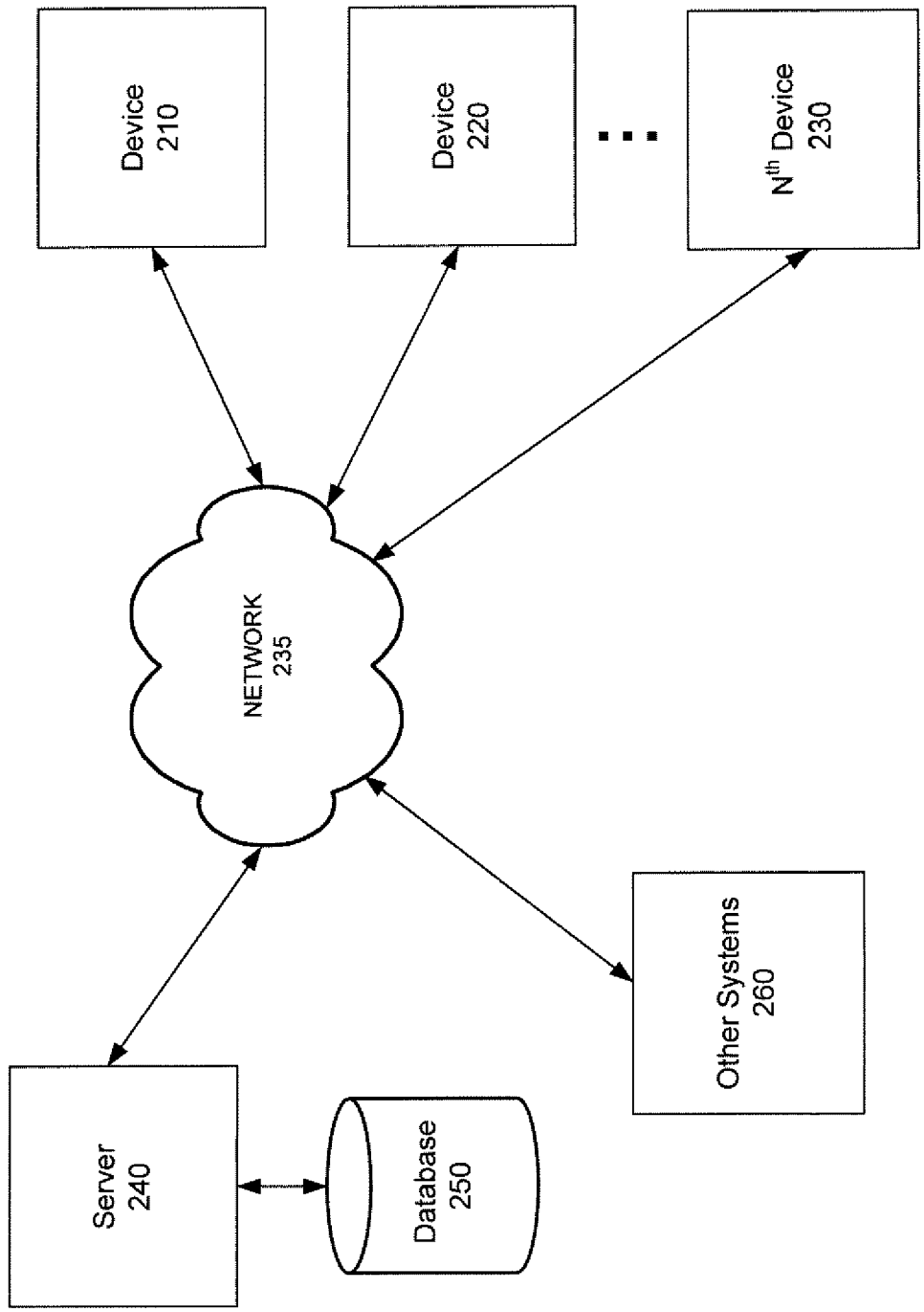
FIG. 2 is a depiction of a system according to exemplary embodiments.

FIG. 2 is a system according to an exemplary embodiment of the invention. System 200 may provide various functionality and features associated with the program. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that system 200 may be integrated into and run on a computer, which may include a programmed processing machine which has one or more processors. Such a processing machine may execute instructions stored in a memory to process the data. System 200 may be integrated into and run on one or more computer networks which may each have one of more computers associated therewith.

System 200 may include a device 210, a second device 220, and an Nth device 230, a network 235, a server 240, a database 250, and other systems 260.

As noted above, the processing machine executes the instructions that are stored in the memory or memories or persistent or non-transitory data storage devices to process data. This processing of data may be in response to commands by a user or users of the processing machine, in response to previous processing, in response to a request by another processing machine and/or any other input, for example. As described herein, a module performing functionality may have a processor.

According to exemplary embodiments, the system 200 may be configured to carry out the methods and serve the website(s) as described herein. The system 200 may have device 210 associated therewith. A second device 220 and an Nth device 230 may be further associated with the system 200. The devices 210, 220, and 230 may each be a processing machine. Each device 210, 220, and 230 may include software and/or modules to implement the methods described herein according to exemplary embodiments. Each device 210, 220, and 230 may provide processing, display, storage, communications, and execution of commands in response to inputs from a user thereof and respond to requests from the software and/or modules.

The devices 210, 220, and 230 may each represent computer terminals, communicatively coupled to the network 235, as shown. These computer terminals may be associated with or used by the users in the method described in FIG. 1, for example.

The devices 210, 220, and 230 may be configured to perform other functions and processing beyond the methods described herein. The devices 210, 220, and 230 may be multi-functional in operation. In some embodiments, the devices 210, 220, and 230 may be a portable or hand-held computing or electronic device, or other type of computing device, that has the described functionality. For example, the devices 210, 220, and 230 may be a tablet computing device. The portable electronic devices, by way of non-limiting examples, may include such hand-held/portable computing and communications devices as mobile phones (e.g., cell or cellular phones), smart phones (e.g., iPhones, Android based phones, or Blackberry devices), personal digital assistants (PDAs) (e.g., Palm devices), laptops, netbooks, tablets, or other portable computing devices. These portable electronic devices may communicate and/or transmit/receive data over a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data from the portable electronic device. The portable electronic device may use standard wireless protocols which may include IEEE 802.11a, 802.11b, 802.11g, and 802.11n. Such portable electronic devices may be Global Positioning System (GPS) capable. GPS is a satellite based system which sends a signal allowing a device to define its approximate position in a coordinate system on the earth. That is, the portable electronic device may receive satellite positioning data and display the location on the earth of the portable electronic device using GPS. Other location systems may be used. The portable electronic device may include one or more computer processors and be capable of being programmed to execute certain tasks.

Each device 210, 220, and 230 may have a display and an input device associated therewith. The display may be monochrome or color. For example, the display may be a plasma, liquid crystal, or cathode ray tube type display. The displays may be touch screen type displays. The devices 210, 220, and 230 may have more than one display.

The input device may be a single device or a combination of input devices. For example, the input devices may include a keyboard, both full-sized QWERTY and condensed, a numeric pad, an alpha-numeric pad, a track ball, a touch pad, a mouse, selection buttons, and/or a touch screen. As described above, the display may serve as an input device through using or incorporating a touch screen interface. The devices 210, 220, and 230 may include other devices such as a printer.

Network 235 may be a computer based network, with one or more servers and/or computer processors. For example, network 235 may be the Internet or a network connected to the Internet. The network 235 may be a satellite or cellular based network. Information and data may be exchanged through the network 235 between the various components of the system 200. In alternative embodiments, the network 235 may be a local area network within the financial institution that may be connected to or interface with the Internet. It should be appreciated that the network 235 may be a combination of local area networks, wide area networks, and external networks, which may be connected to the Internet.

The server 240 may be communicatively coupled to the network 235. The server 240 may perform operations associated with the method described herein, such as, for example, serving the website pages as described herein. The server 240 may consist of one or more servers and/or general purpose computers, each having one or more computer processors associated therewith.

The server 240 may have a database 250 communicatively coupled thereto. The database 250 may contain data and information used by the system 200. For example, the database 250 may store account data for financial institution account holders. Additional information maybe contained therein related to the operation and administration of the system 200. The database 250 may include any suitable data structure to maintain the information and allow access and retrieval of the information. For example, the database may keep the data in an organized fashion. The database 250 may be a database, such as an Oracle database, a Microsoft SQL Server database, a DB2 database, a MySQL database, a Sybase database, an object oriented database, a hierarchical database, a flat database, and/or another type of database as may be known in the art that may be used to store and organize rule data as described herein.

The database 250 may be stored in any suitable storage device. The storage device may include multiple data storage devices. The multiple data storage devices may be operatively associated with the database 250. The storage may be local, remote, or a combination thereof with respect to the database. The database 250 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The database may have back-up capability built-in. Communications with the database 250 may be over a network, such as the network 235, or communications may be over a direct connection between the database 250 and the server 240, as depicted in FIG. 2. Data may be transmitted and/or received from the database 250. Data transmission and receipt may utilize cabled network or telecom connections such as an Ethernet RJ15/Category 5 Ethernet connection, a fiber connection, a traditional phone wireline connection, a cable connection or other wired network connection. A wireless network may be used for the transmission and receipt of data.

The system 200 may have other systems 260 associated therewith. These other systems 260 may include third party system(s). These third party systems may be remotely located from the server 240. Communications may occur over the network 235. The third party system may provide support to the financial institution for the website. In some embodiments, the third party system may be a marketing system or a data collection system. The third party system may gather data about users of the website. Such information may be used to provide targeted advertizing or other targeting information to the user. The third party system may set a data device, such as a cookie, onto the computing device of the user. This cookie may be used to identify the user in a future visit or to track the user's activity on-line for data gathering.

Figure 3A:
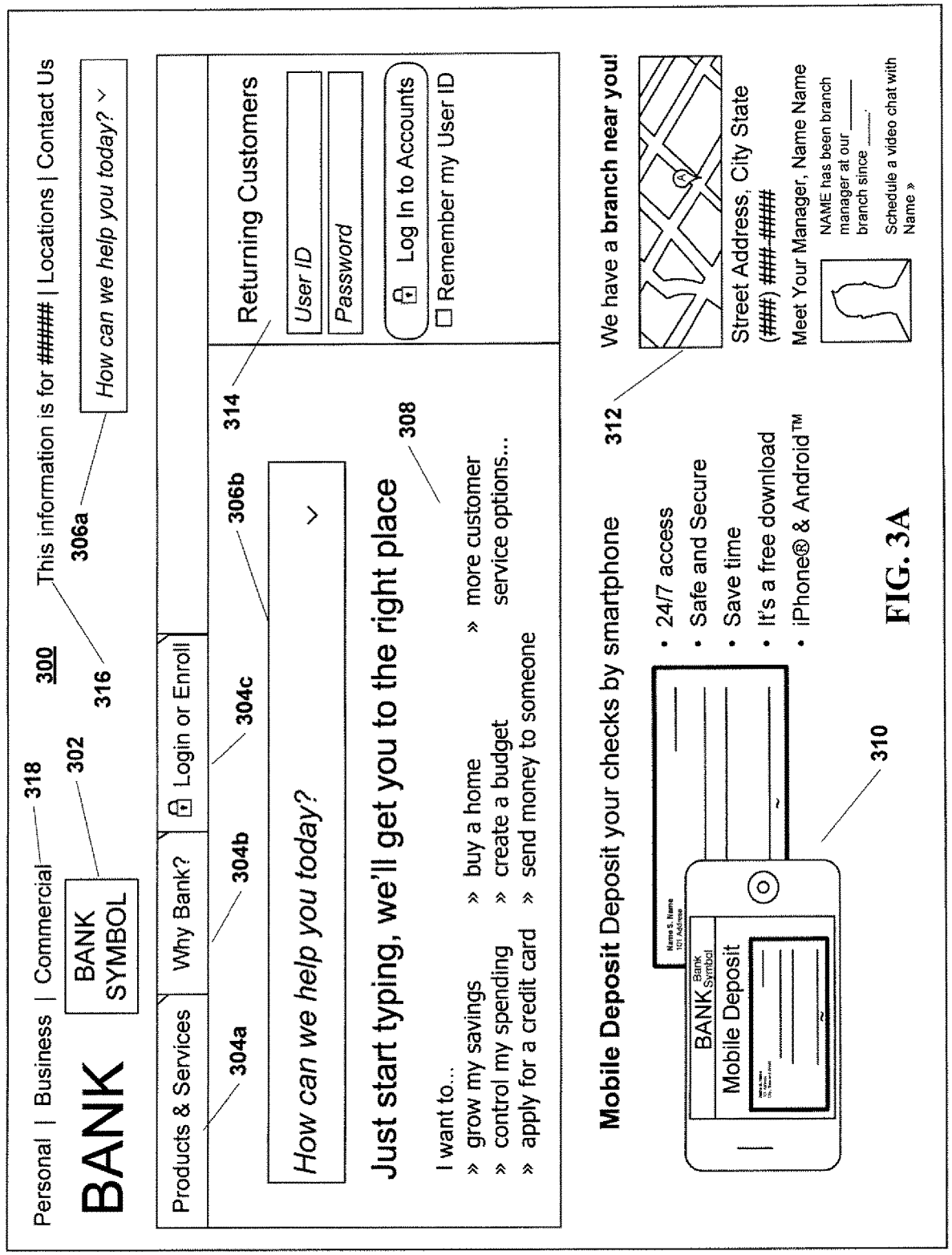
FIG. 3 is a depiction of an upper portion of a login webpage for a financial institution website according to exemplary embodiments.
FIG. 3B is a depiction of a lower portion of the login webpage according to exemplary embodiments.

FIG. 3A is a depiction of an upper portion of a login webpage according to exemplary embodiments. Webpage 300 may be a homepage associated with a financial institution. The webpage may have a particular web address or URL. The webpage 300 may be accessed using a computing device by using a web browser, such as described above in the method of FIG. 1. The web address may be enter into the address bar of the web browser. Once entered, and if the computing device is connected to the Internet or another appropriate computer network, the webpage 300 may be display once the web address is resolved. It should be appreciated that layout and arrangement of the webpage 300 is meant to be exemplary as the layout and arrangement of the webpage 300 may be varied but still contain the elements depicted. Furthermore, additional elements may be included on the webpage. This reasoning also applies to the depictions of other exemplary webpages described hereafter as part of the exemplary embodiments. The webpage 300 may be the homepage or portal page for the financial institution website (on the unsecured side). Stated differently, the webpage 300 may be the login page for the website. The elements of the webpage 300 will now be described.

It should further be appreciated that the webpage 300, as well as the other webpages described herein, may be accessible from portable electronic devices. The webpages may have mobile counterparts which are optimized for display on such devices. However, the elements described herein may still be present on such mobile webpages, in the same or alternate configuration. For example, a mobile version of the webpage 300 may have a different layout and menu interface optimized for the mobile display. In some embodiments, the user may be able to select the mobile version or the full version of the webpage from their portable electronic device. In other embodiments, an application or widget may be provided for a portable electronic device that allows access to the webpages described herein.

A financial institution name and symbol 302 may be displayed on the webpage. This financial institution may be the one associated with the webpage.

The tabs 304a, b, and c may represent menu selections. These menu selections may be selected prior to a login. The information contained in the associated menus may therefore be accessible to the general public and not be restricted to customer's of the financial institution. While in FIG. 3A, three exemplary tabs 304a, b, and c are depicted, more or less tabs may be included. When actuated, the tab 304 may cause a menu to appear, such as a drop down menu, or for a new webpage to be brought forward such as a new frame.

A search bar 306a and b may be included. The search bar 306a may be a drop down set of menu selections from which a desired topic may be selected. The search bar 306b may be a similar search bar. In some embodiments, one or both of the search bars 306a and b may allow for the entry of text such that the user may enter a desired search topic. Predictive completion may be used so that as the user enters the desired search topic, a list of potential search topics is displayed to auto-complete the entry the user has begun.

The options area 308 may provide the user with a list of potential selections for actions. These options may be based upon data gathered from historical usage of the website as to what the most popular or commonly selected options are. The options area 308 may be updated periodically as the most commonly selected options changes over time.

An ad or media display 310 may display an advertisement or other media relating to the financial institution and its services. The ad or media display 310 may change periodically and may be different for each visit to the webpage 300. In some embodiments, the ad or media display 310 may change at certain time intervals while the webpage 300 is displayed. For example, the display 310 may dynamically change with different ads or media being displayed over a period of time. A predetermined rotations of displays may be used.

The location information 312 may relate to a location of a branch of the financial institution that is near the assumed location of the user of the webpage 300. The location information may be based on data gathered from the user's computer, such as a cookie, or based on an IP address associated with the user. In some embodiments, the location information may be based on information gathered from a portable electronic device associated with the user, if the website is accessed from such a device.

A login area 314 provides for entry of a username and password to allow access to the secure features of the website as described herein.

An information/link area 316 may provide additional information and menu options as depicted.

A website characterization 318 may indicate what type of website is being accessed. The financial institution may have different websites for different customer or user types. The website characterization 318 may provide links to bring up these different websites. According to exemplary embodiments, the webpages described herein are related to the personal customers. The other websites, such as business and commercial, may have similar features and elements but be tailored to the needs of those particular users or customers.

Figure 3B:
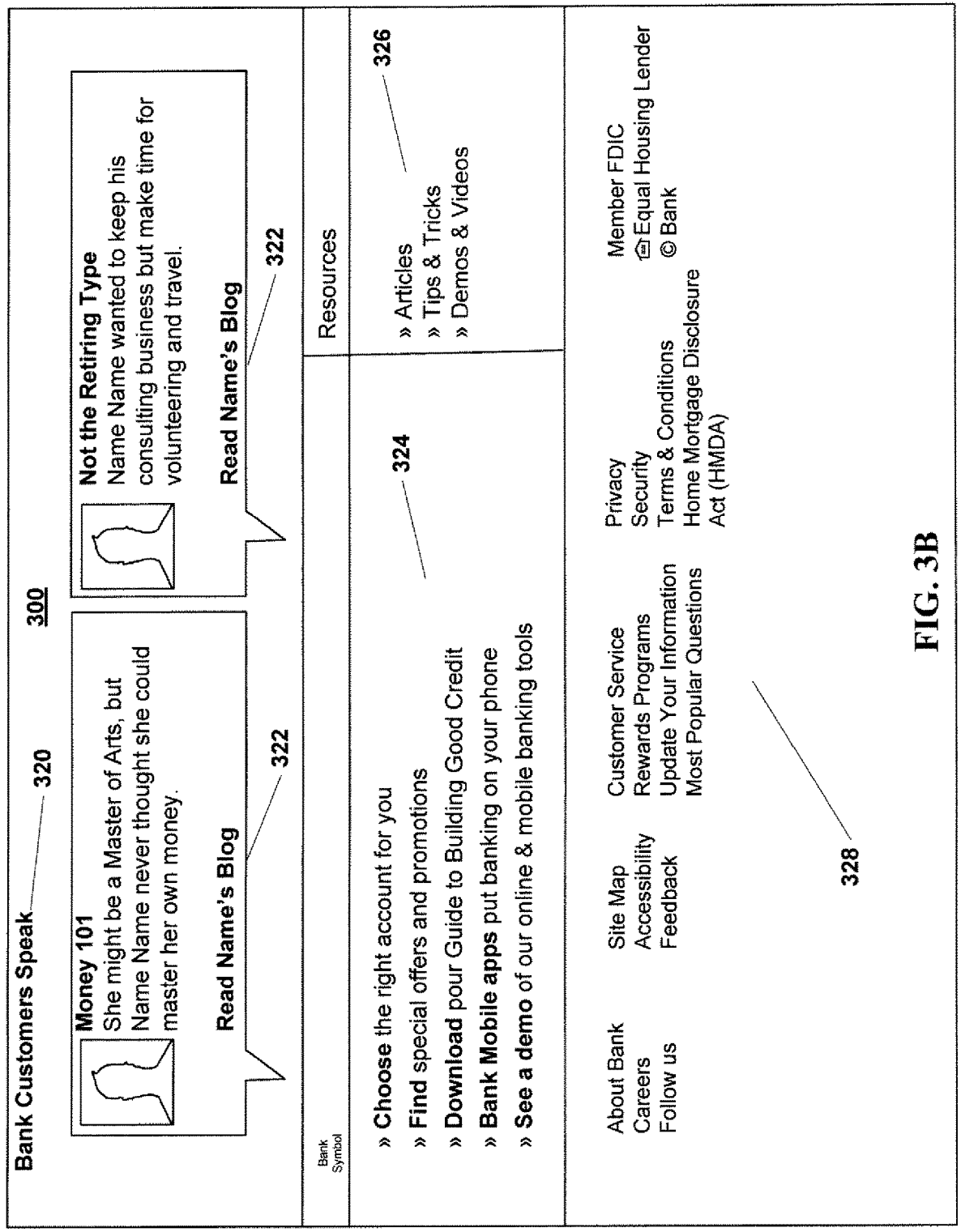

FIG. 3B is a depiction of a lower portion of a login webpage according to exemplary embodiments. Thus, FIGS. 3A and 3B may represent an entire webpage. The webpage 300 may thus require the user to scroll up or down to view portions of the webpage; stated differently, the webpage may not be able to be viewed in its entirety in a window using a web browser.

A testimonial section 320 may provide quotes from customers or financial institution employees for the user's reading enjoyment. As a part of this section, blog links 322 may be provided for the users to access and interact more with the customer or financial institution employee. This section may be used to provide the user with reviews or other news articles regarding the financial institution.

A financial institution information section 324 may provide links to financial institution services and product information.

An assistance section 326 may provide links to help information relating to the website usage or the financial institution products and services.

A site menu selection 328 may be provided. This may be a site map of the various options and webpages associated with the website. These links may lead to different webpages and may not require a login to get to the webpages.

In the subsequent figures depicted other features of the webpages associated with the website according to exemplary embodiments, these webpages have, in many cases, similar features to thus described with respect to FIGS. 3A and 3B. These similar features are shown in the figures but may not be separately described repetitively for each figure. In these cases, it should be understood that these features are the same as those described above with respect to FIGS. 3A and 3B. For example, the webpages, as may be seen in the figures, may have similar navigation selections and information at the upper and lower portions of the webpages. The consistency of features and navigation selections may provide the user with a homogenous experience as they navigate the website according to exemplary embodiments.

Figure 4A:
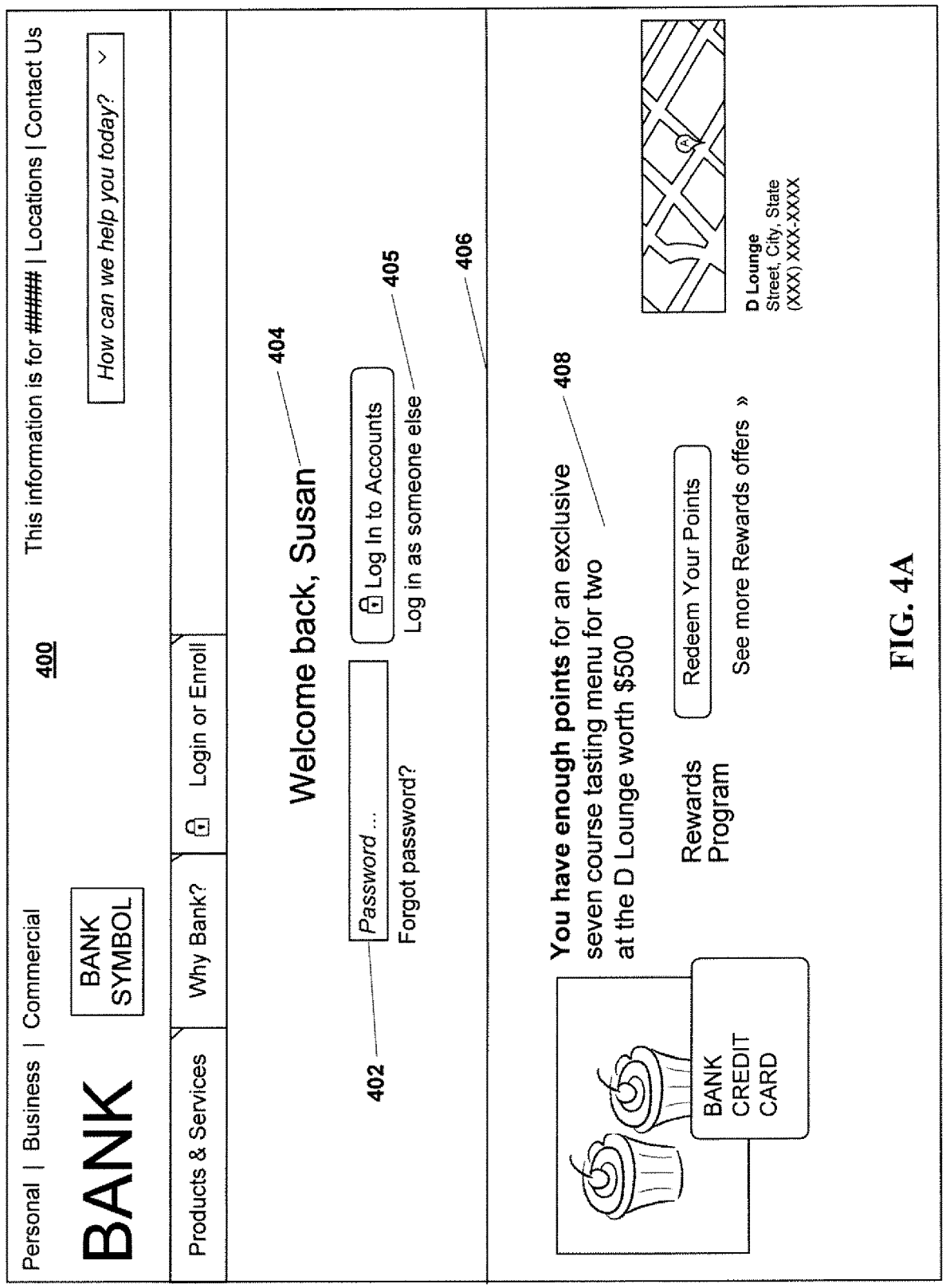
FIG. 4A is a depiction of an upper portion of a login webpage for a financial institution website for returning users according to exemplary embodiments.
Figure 4B:
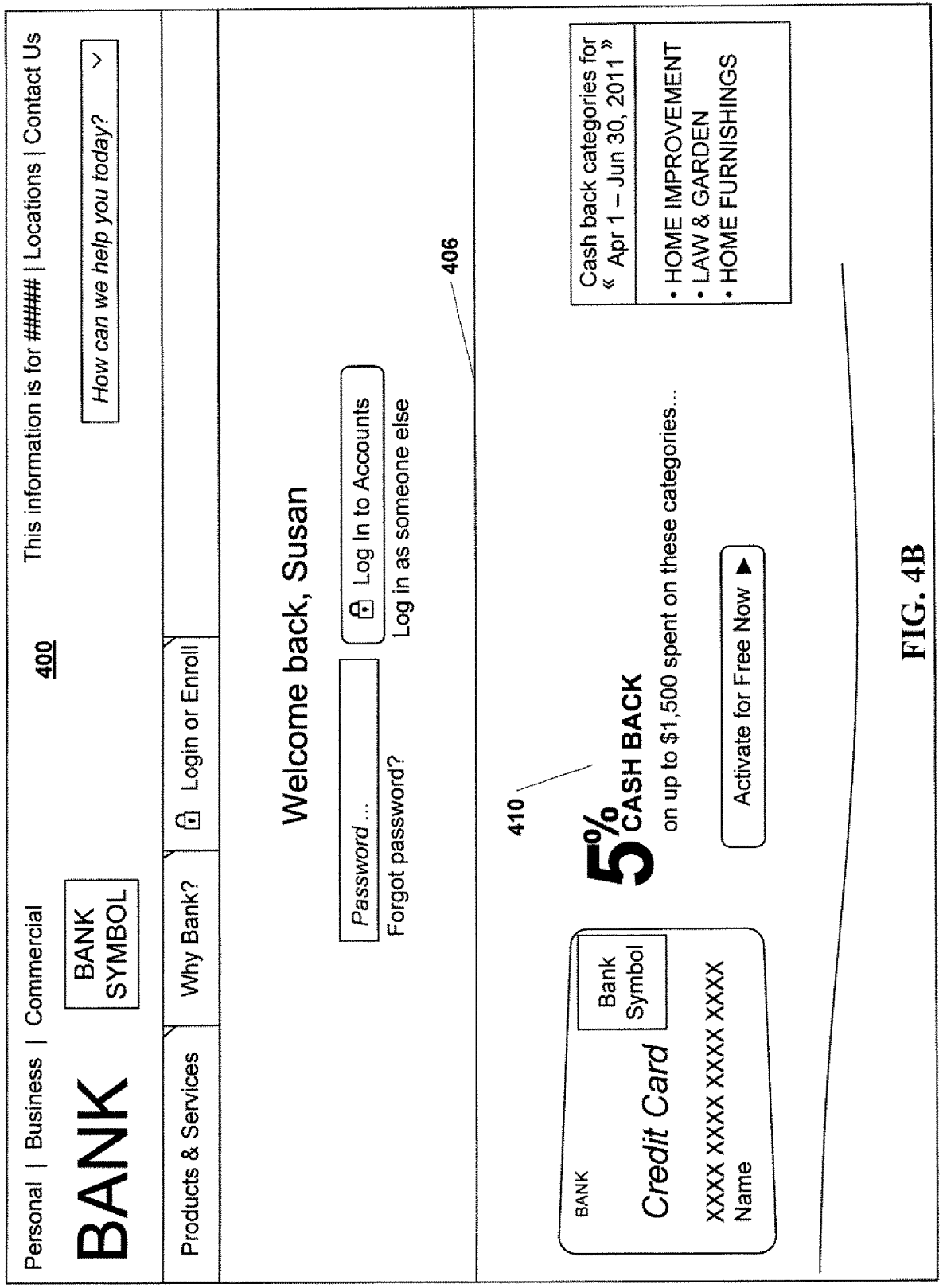
FIG. 4B is a second depiction of an upper portion of the login webpage for returning users according to exemplary embodiments.

FIGS. 4A and 4B are depictions of an upper portion of a login webpage 400 for returning users according to exemplary embodiments. As depicted in FIGS. 4A and 4B, the webpage 400 may have similar features to the webpage 300. The webpage 400 may have a lower portion similar to that as depicted in FIG. 3B. However, the webpage 400, as depicted, may differ from the webpage 300. The webpage 400 may be displayed for users who are returning customers. The webpage 400 may be displayed for a user who has visited the webpage 300 previously and is returning to the financial institution's website in another browsing session, for example. The user may be identified as a returning user based on one or more identifying factors, such as the presence of one or more cookies on the user's computing device. Other factors may be used to identify the user as a returning user. In some embodiments, if the user is a returning user, but is returning to the website on a different computing device than used previously, the user may not be recognized. In that case, the webpage 300 may be displayed.

The webpage 400 may be customized for the returning user. The webpage 400 may have a login area 402 that allows for an abbreviated login process. The user may only have to enter their password instead of entering a username and password. The user may be identified by name in a message 404. In some embodiments, upon a failed login attempt, the webpage 300 may be displayed for user. At 405, the user may select to login as someone else. This selection may cause the webpage 300 to be displayed.

Below the login portion, a message area 406 may display a message 408 for the user that is customized for the user by the financial institution. For example, as depicted in FIG. 4A, the user may be offered an exclusive rewards deal from the financial institution. The message area 406 may offer a way to redeem or otherwise act on the deal. Other messages are possible include advertisements and media. In some embodiments, the message area 406 may contain an offer or advertisement from a third party that is associated with the financial institution. For example, an offer may be presented to the user from a merchant who is a partner with the financial institution. The information for the message may be determined by the financial institution based on the user's profile and account activity.

In FIG. 4B, the webpage 400 is depicted again. However, the message area 406 is depicted with a second exemplary message 410.

In some embodiments, the message may be a congratulations on a particular life event, such as a birthday, anniversary, or recent purchase. Accordingly, the message is not always an offer or advertisement but may have a wide variety of contents.

Figure 5A:
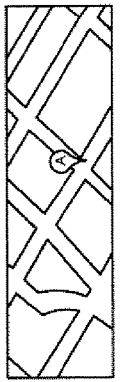
FIG. 5A is a depiction of the login webpage for a financial institution website showing menu options according to exemplary embodiments.

FIG. 5A depicts a view of the webpage 300 depicting the menu options 502 available at the tab 304*a*. The menu options 502 may drop down when the tab 304*a* is selected. Further selection of one of the menu options 502 may cause an additional menu to appear for the selected option or the requested information may be provided. The requested information may be provided in a pop up window or it may be caused to appear on the webpage 300 or the requested information may appear in a fly-out window from the selected item. It should be appreciated that although the webpage 300 is depicted, the same tab options may be available on the webpage 400 as shown in FIGS. 4A and 4B.

Figure 5B:
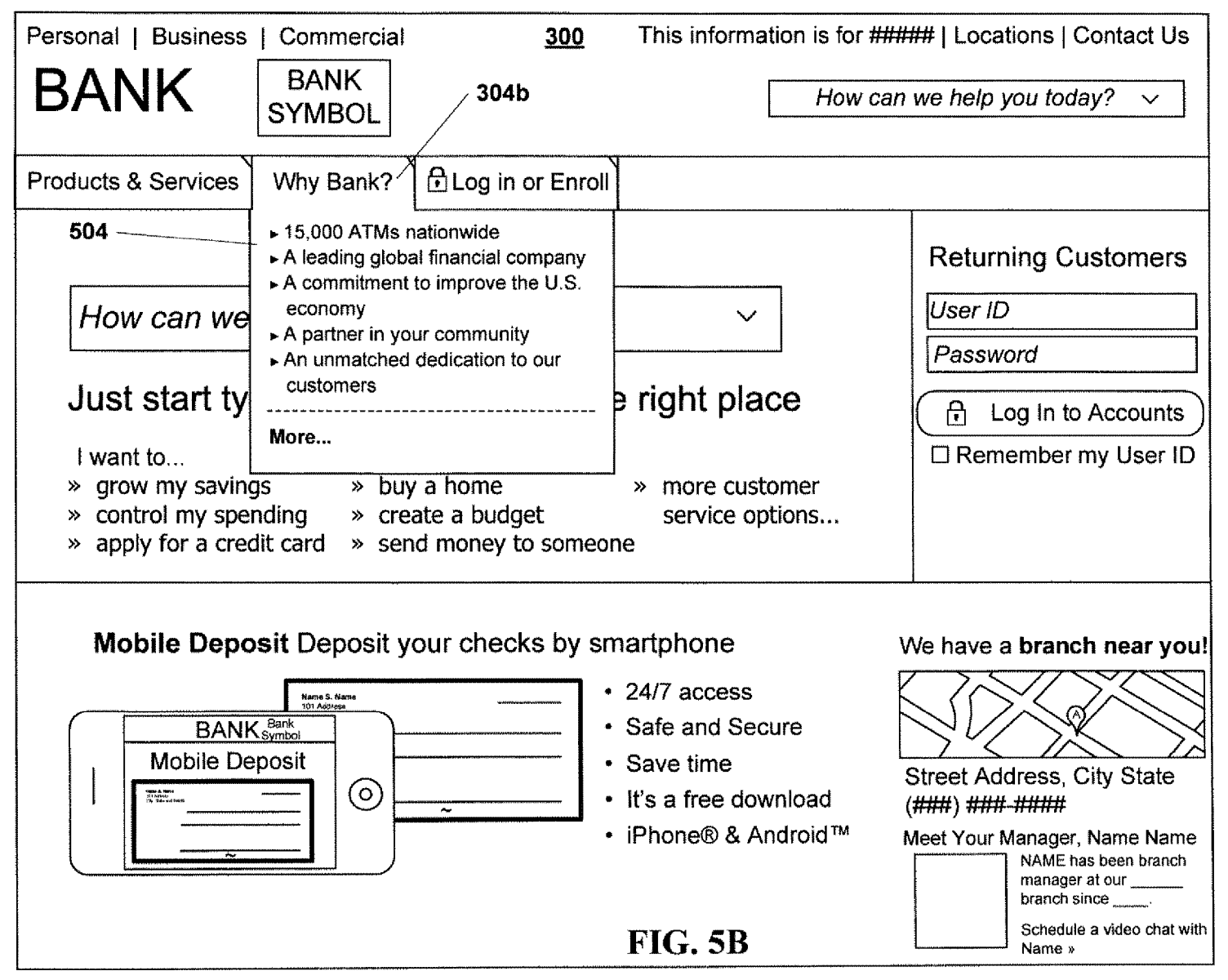

FIG. 5B depicts a view of the webpage 300 depicting the menu options 504 available at the tab 304*b*. The menu options 504 may drop down when the tab 304*b* is selected. Further selection of one of the menu options 504 may cause an additional menu to appear for the selected option or the requested information may be provided. The requested information may be provided in a pop up window or it may be caused to appear on the webpage 300 or the requested information may appear in a fly-out window from the selected item. It should be appreciated that although the webpage 300 is depicted, the same tab options may be available on the webpage 400 as shown in FIGS. 4A and 4B.

Figure 5C:
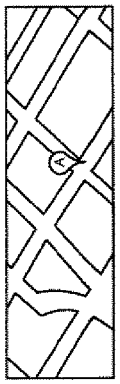
FIG. 5C is a depiction of the login webpage showing menu options according to exemplary embodiments.

FIG. 5C depicts a view of the webpage 300 depicting the menu options 506 available at the tab 304*c*. The menu options 506 may drop down when the tab 304*c* is selected. The menu options 506 may allow the customer to login into the website as described above. The menu options 506 may also have a new customer enrollment option 508. This may allow a new customer to enroll with the financial institution and create a login to the website. The selection of this option may bring up a separate enrollment webpage. This webpage may open in a new window or tab. It should be appreciated that although the webpage 300 is depicted, the same tab options may be available on the webpage 400 as shown in FIGS. 4A and 4B.

Figure 6A:
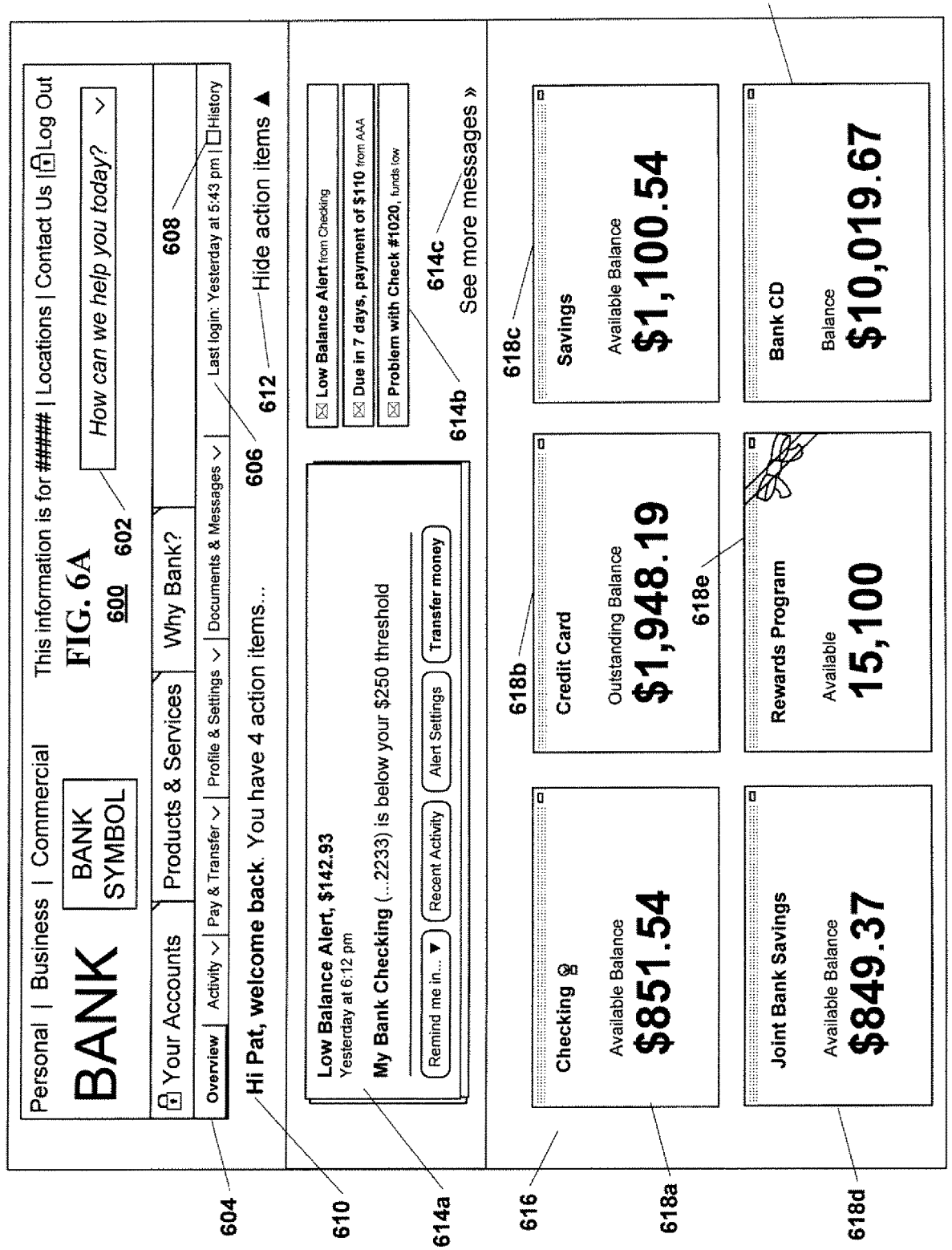
FIG. 6A is a depiction a secure home webpage for a financial institution website according to exemplary embodiments.
Figure 6B:
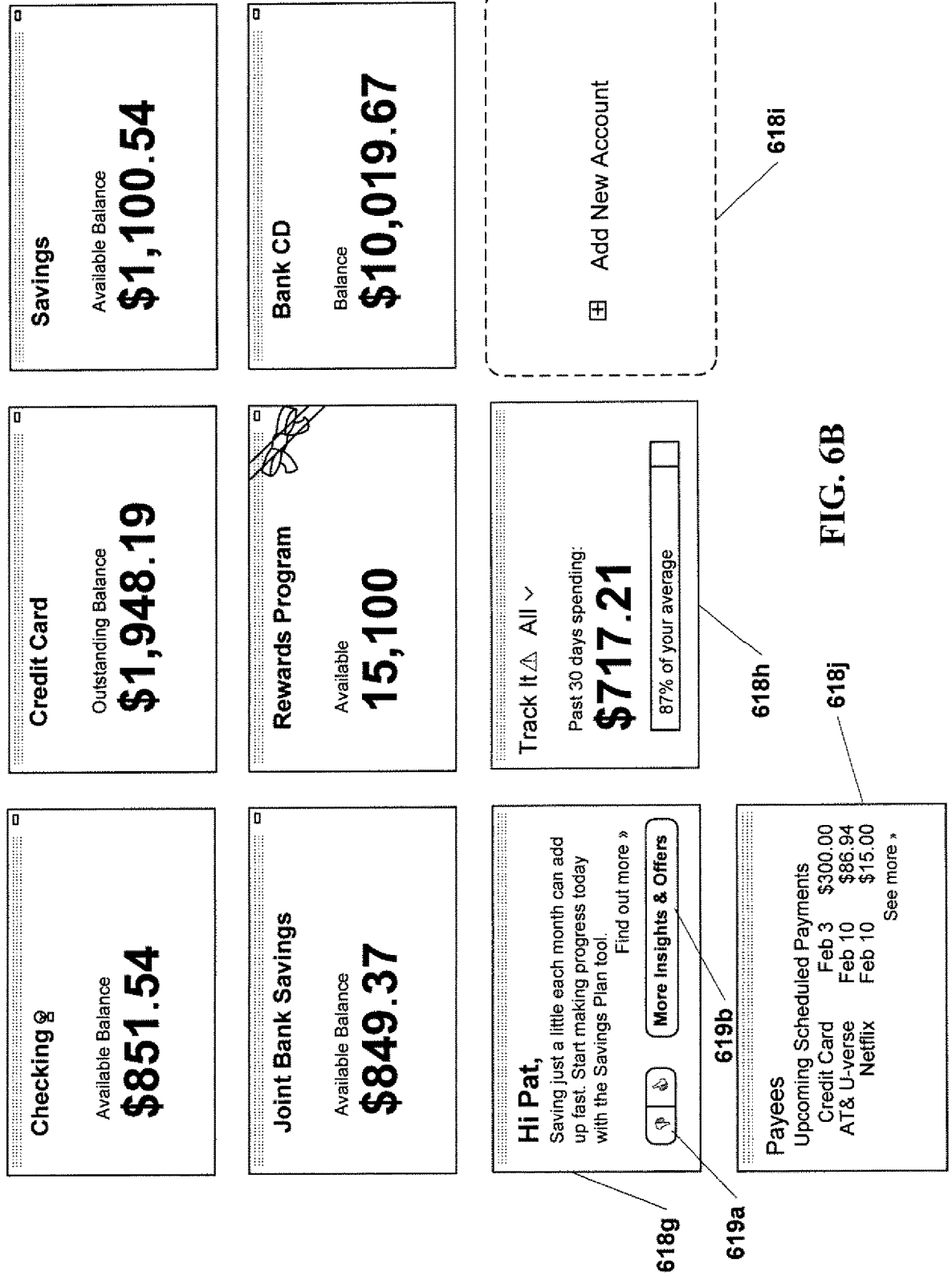
FIG. 6B is a depiction of an embodiment of an account information portion of the secure home webpage according to exemplary embodiments.
Figure 6C:
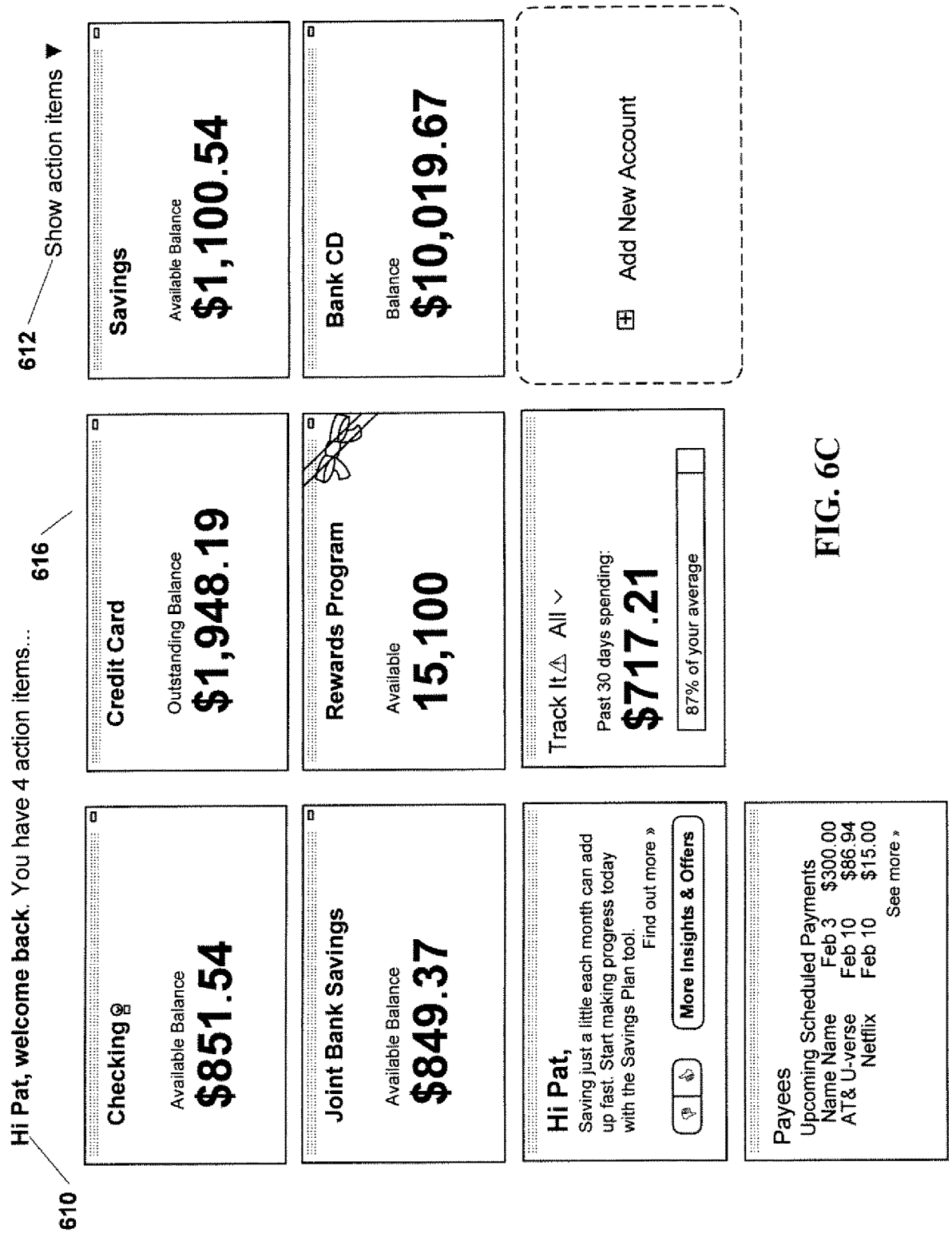
FIG. 6C is a depiction the secure home webpage according to exemplary embodiments.

FIGS. 6A-C depict a secure webpage 600 and its exemplary components. FIG. 6A depicts a secure webpage 600 that may be displayed following a successful login from either the webpage 300 or 400. The webpage 600 may provide a base for the user to access information and interact with the various options. The webpage 600 may be secure.

A search box 602 may be provided. The search bar 602 may be a drop down set of menu selections from which a desired topic may be selected. In some embodiments, the search bar 602 may allow for the entry of text such that the user may enter a desired search topic. Predictive completion may be used so that as the user enters the desired search topic, a list of potential search topics is displayed to auto-complete the entry the user has begun.

A set of menu selections 604 may be provided.

The last login display 606 may indicate the last time the user logged into the webpage 600.

A history selection 608 box may allow the user to bring up their browsing and/or action history with respect to the webpage 600.

A personalized message 610 may be presented that identifies the user by name and provides a status update for the user.

A hide action items selection 612 may allow the user to hide the section containing the message alert center 614*a, b,* and *c*. This option may be toggled to hide and unhide the section. FIG. 6C depicts a portion of the webpage 600 with the hide action items selection 612 actuated to hide the message alert center 614*a, b,* and *c*. The personalized message 610 may still be visible and the account information center 616 (described below) may be visible.

A message alert center 614*a* and 614*b* may be provided to convey information requiring potential user action to the user.

A message access selection 614*c* may allow the user to view additional or past messages. These messages may be located in the inbox area as described below.

An account information center 616 may be provided. This area may provide a summary of and access to accounts associated with the user. This area may be customizable as to which accounts may be displayed. The arrangement of the accounts (e.g., the order the accounts are arranged in) may be customizable by the user. The accounts shown may be accounts associated with the financial institution. In some embodiments, other accounts, such as those with third parties or other financial institutions, may be displayed. The account information may be displayed in various boxes. For example, account information boxes 618*a*, 618*b*, 618*c*, 618*d*, 618*e*, 618*f* may be used to display the user's account information.

FIG. 6B is a depiction of the account information center 616 of the webpage 600. The account information center 616 may contain additional information that may require the user to scroll up or down to view the additional information. The account information center 616 depicted in FIG. 6A may be one embodiment. FIG. 6B depicts another embodiment of the account information center 616. As can be seen, FIG. 6B depicts additional account information boxes.

The account information boxes 618*g*, 618*h*, 618*i*, 618*j* may be similar to those depicted above in FIG. 6A. These account information boxes may be displayed below the account information boxes depicted in FIG. 6A on the same webpage.

Box 618*g* may contain a message or other information for the user. The position of box 618*g* may change with each login. In some embodiments, the box 618*g* may be positioned by the user. The user may be able to select whether they like the type of message displayed in the box 618*g* using a thumbs up or thumbs down icon (as depicted in the lower left corner of the box 618*g* at 619*a*. This may allow the financial institution to better understand the type of information that the user is interested in receiving. The box 618*g* may contain a button 619*b* allowing the display of other offers and messages. The button may toggle the contents of the box 618*g* to a new display when actuated. That is, a different message may be displayed.

Box 618*i* may allow the addition of another account. Box 618*j* may be a reminder or alert box. The box 618*j* may contain alerts relating to upcoming payments that the user has coming due. The contents of the box 618j may be configured by the user. Selection of an item in the box 618j may bring up a pop-up window or another webpage which may allow the user to conduct or complete the required payment. The contents of the box 618j may be tied to accounts associated with the financial institution. In some embodiments, the box 618j may include third party or other financial institution accounts. The contents of the box 618j may be related to a web bill payments or similar payments.

Figure 7A:
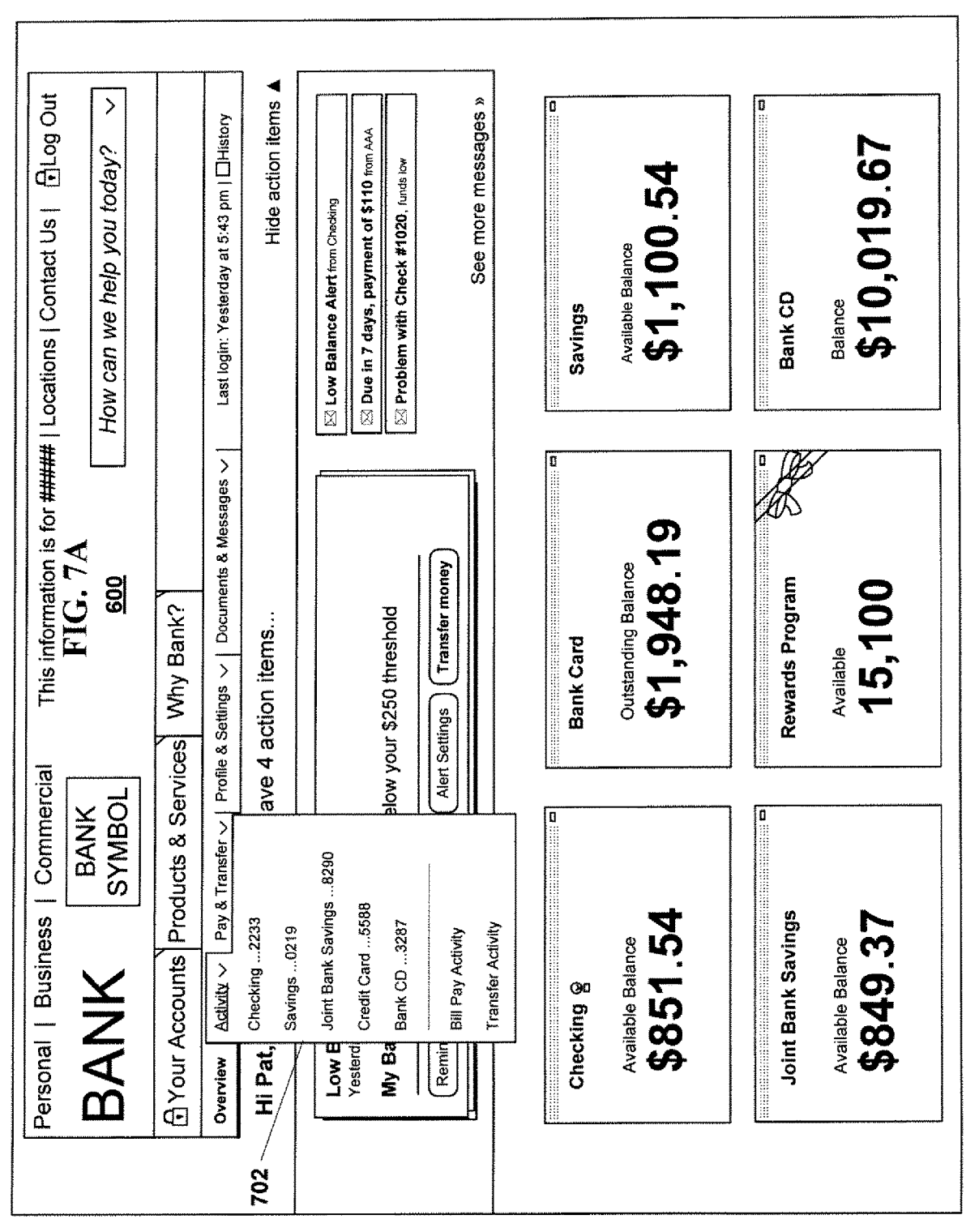

FIG. 7A depicts a view of the webpage 600 depicting a set of menu options 702 available from the menu selections 604. The menu options 702 may drop down when the indicated item on the menu selections 604 is actuated or rolled over with the screen cursor. Further selection of one of the menu options 702 may cause an additional menu to appear for the selected option or the requested information may be provided. The requested information may be provided in a pop up window or it may be caused to appear on the webpage 600 or the requested information may appear in a fly-out window from the selected item.

Figure 7B:
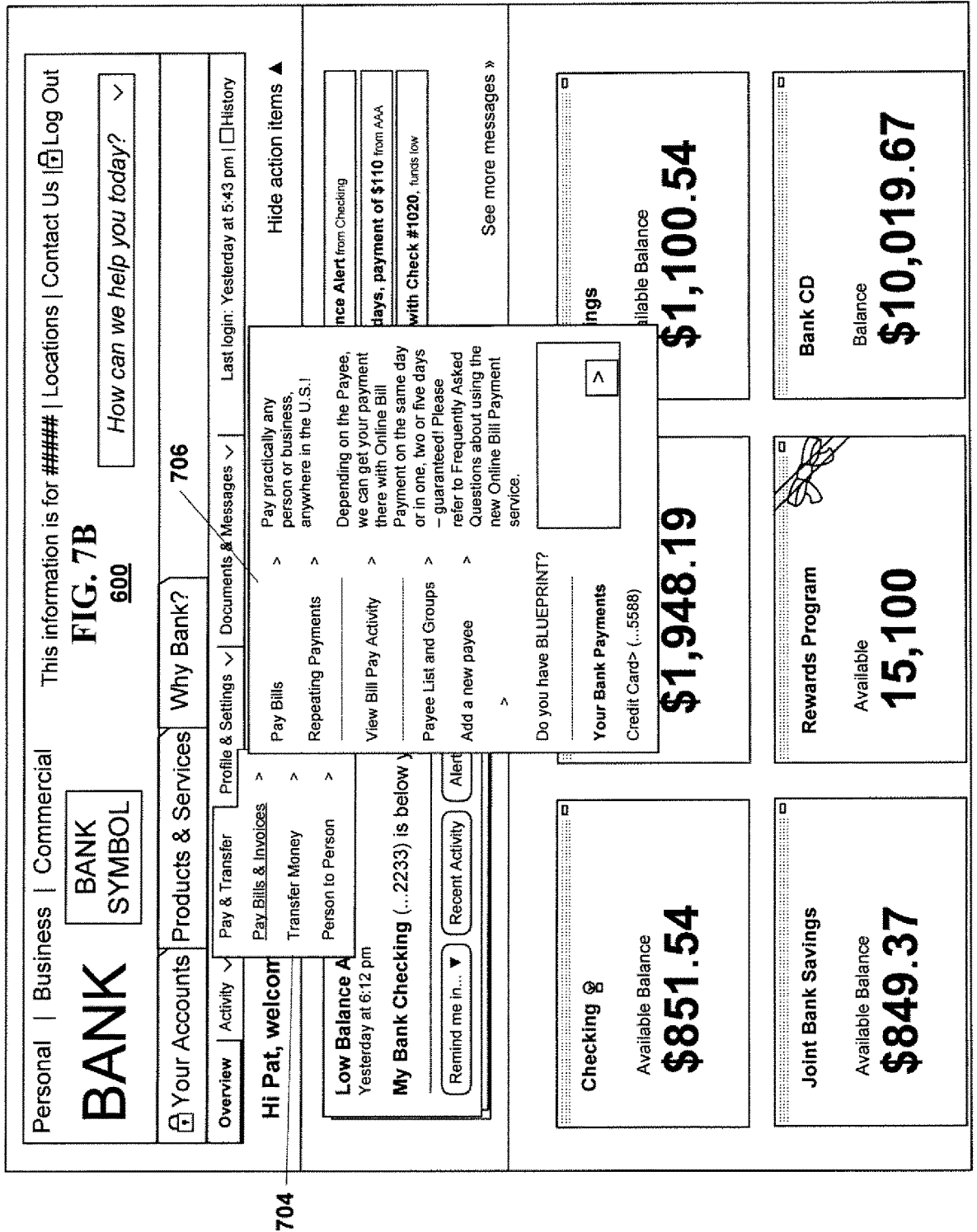
FIG. 7B is a depiction of the secure home webpage showing menu options according to exemplary embodiments.

FIG. 7B depicts a view of the webpage 600 depicting a set of menu options 704 available from the menu selections 604. The menu options 704 may drop down when the indicated item on the menu selections 604 is actuated or rolled over with the screen cursor. Further selection of one of the menu options 704 may cause an additional menu to appear for the selected option or the requested information may be provided. The requested information may be provided in a pop up window or it may be caused to appear on the webpage 600 or the requested information may appear in a flyout window from the selected item. For example, as depicted in FIG. 7B, the selection of the initial menu option from the menu selections 604 may cause a first level menu 704 to appear; then, selection of an option from that menu may cause a second level menu 706 to appear. Selection of an option from the second level menu 706 may cause another level to appear and so on as appropriate for whichever menu option is selected until a point is reached where the requested information can be displayed.

Figure 7C:
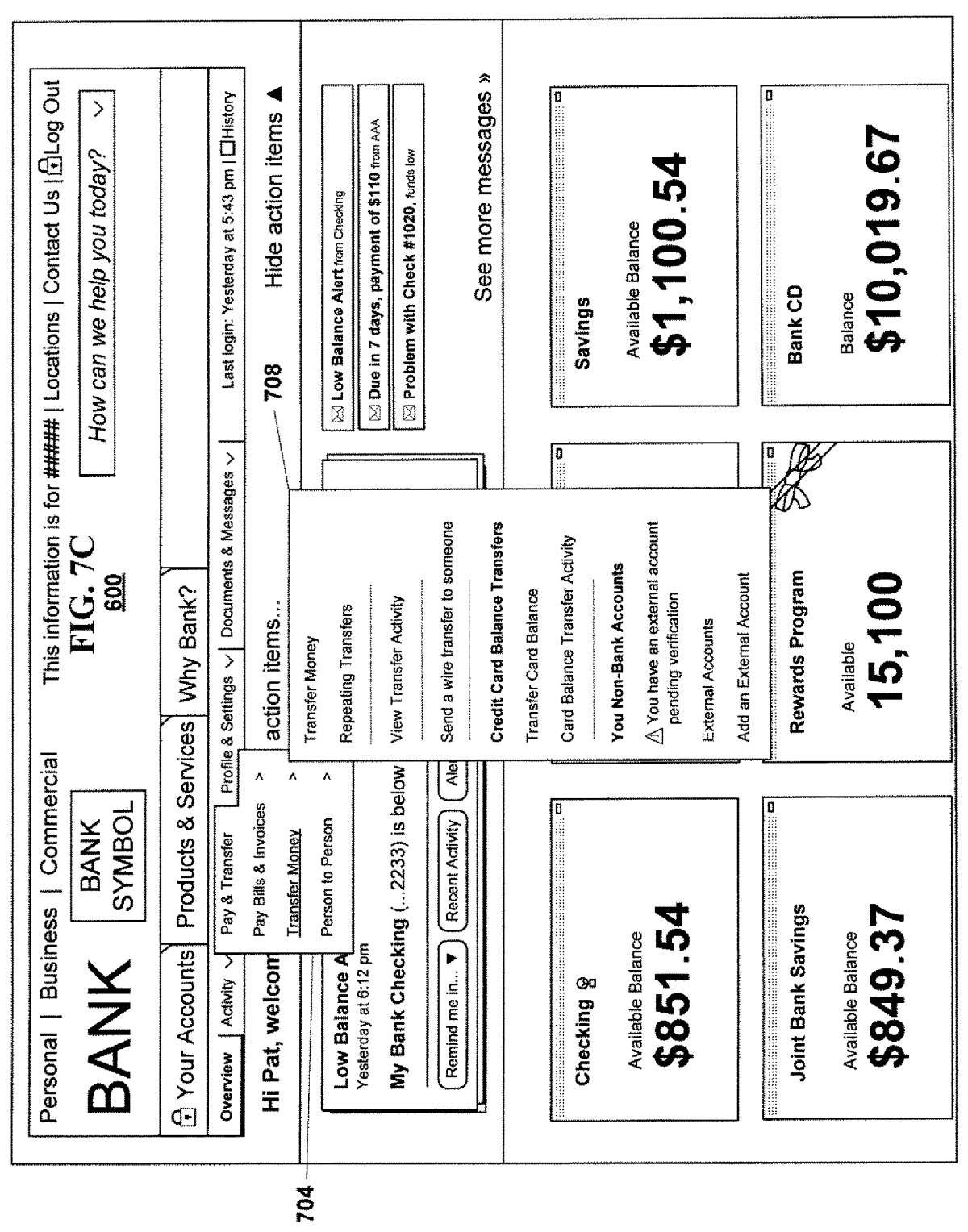

FIGS. 7C and 7D depict a view of the webpage 600 depicting the set of menu options 704. As depicted in FIGS. 7C and 7D, the first level menu 704 is shown with other options selected (different from that depicted in FIG. 7B) causing a second level menu 708 or 710 to appear. Selection of an option from the second level menu 708 or 710 may cause another level to appear and so on as appropriate for whichever menu option is selected until a point is reached where the requested information can be displayed.

Figure 7E:
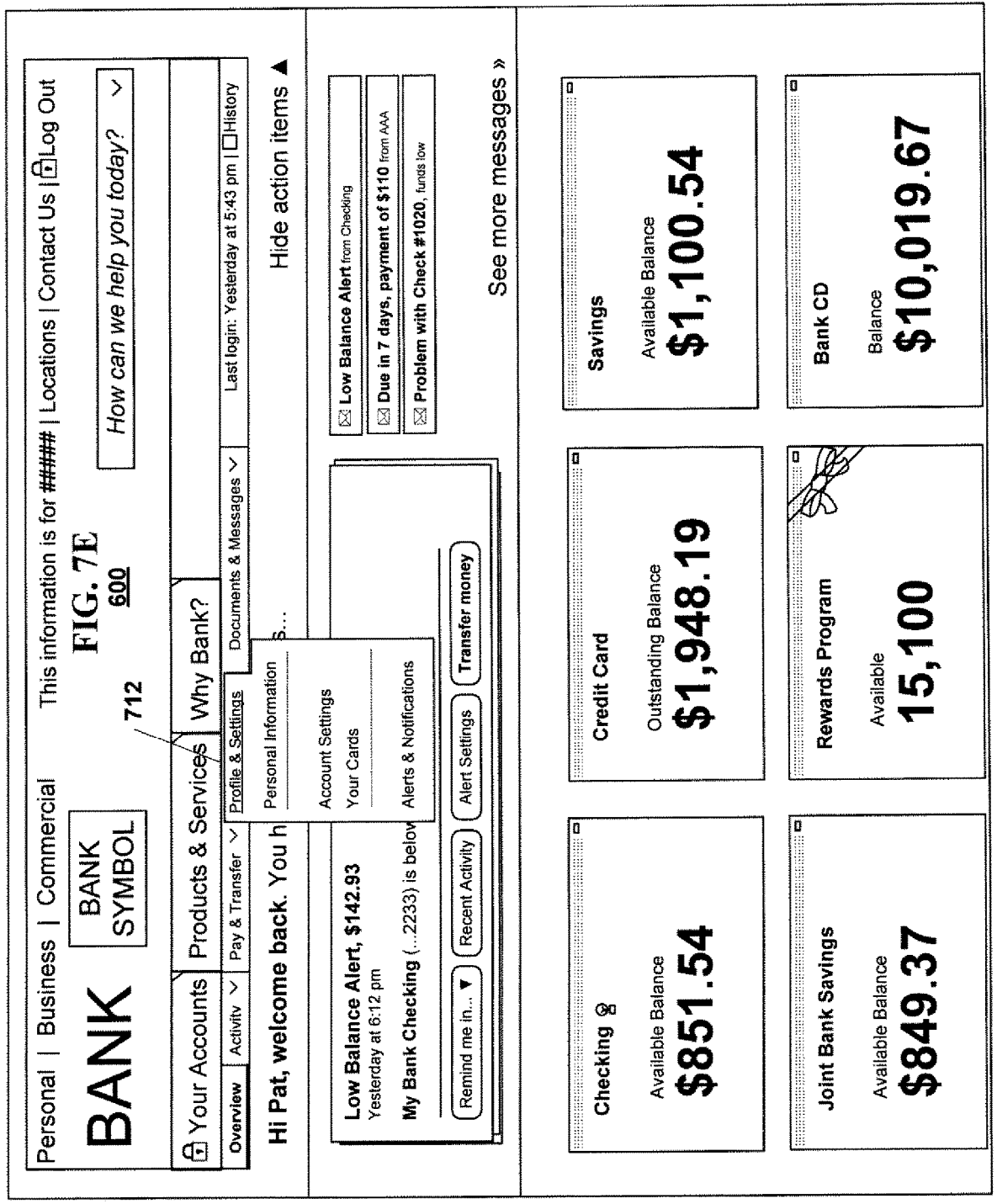
FIG. 7E is a depiction of the secure home webpage showing menu options according to exemplary embodiments.

FIG. 7E depicts a view of the webpage 600 depicting a set of menu options 712 available from the menu selections 604. The menu options 712 may drop down when the indicated item on the menu selections 604 is actuated or rolled over with the screen cursor. Further selection of one of the menu options 712 may cause an additional menu to appear for the selected option or the requested information may be provided. The requested information may be provided in a pop up window or it may be caused to appear on the webpage 600 or the requested information may appear in a flyout window from the selected item.

FIG. 7F depicts a view of the webpage 600 depicting a set of menu options 714 available from the menu selections 604. The menu options 714 may drop down when the indicated item on the menu selections 604 is actuated or rolled over with the screen cursor. Further selection of one of the menu options 714 may cause an additional menu to appear for the selected option or the requested information may be provided. The requested information may be provided in a pop up window or it may be caused to appear on the webpage 600 or the requested information may appear in a flyout window from the selected item.

Figure 8:
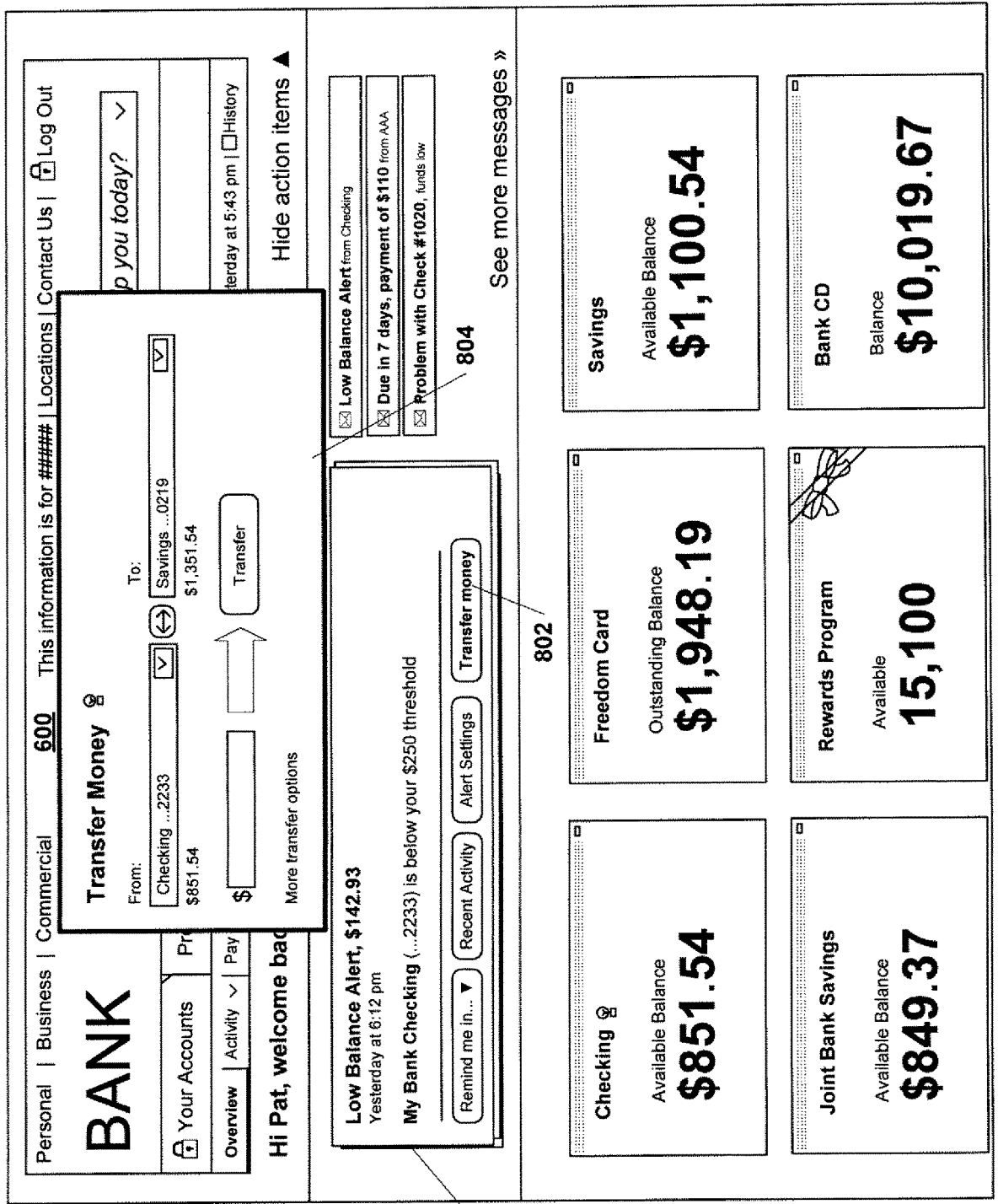
FIG. 8 is a depiction of a pop-up action window on the secure home webpage according to exemplary embodiments.

FIG. 8 depicts a pop-up window 804 on the webpage 600. A described above, the webpage 600 may have the message alert center 614a. The message alert center 614a may have a series of selectable options for further action in response to the displayed alert. These actions may be related to the displayed alert. For example, as shown, the alert concerns a low balance in one of the user's checking accounts. There may therefore be a "transfer money" option 802. Selection of this option may cause a pop-up window 804 to be displayed. The window 804 may allow the user to make appropriate selections to transfer money into the checking account to remedy the identified situation.

Figure 9A:
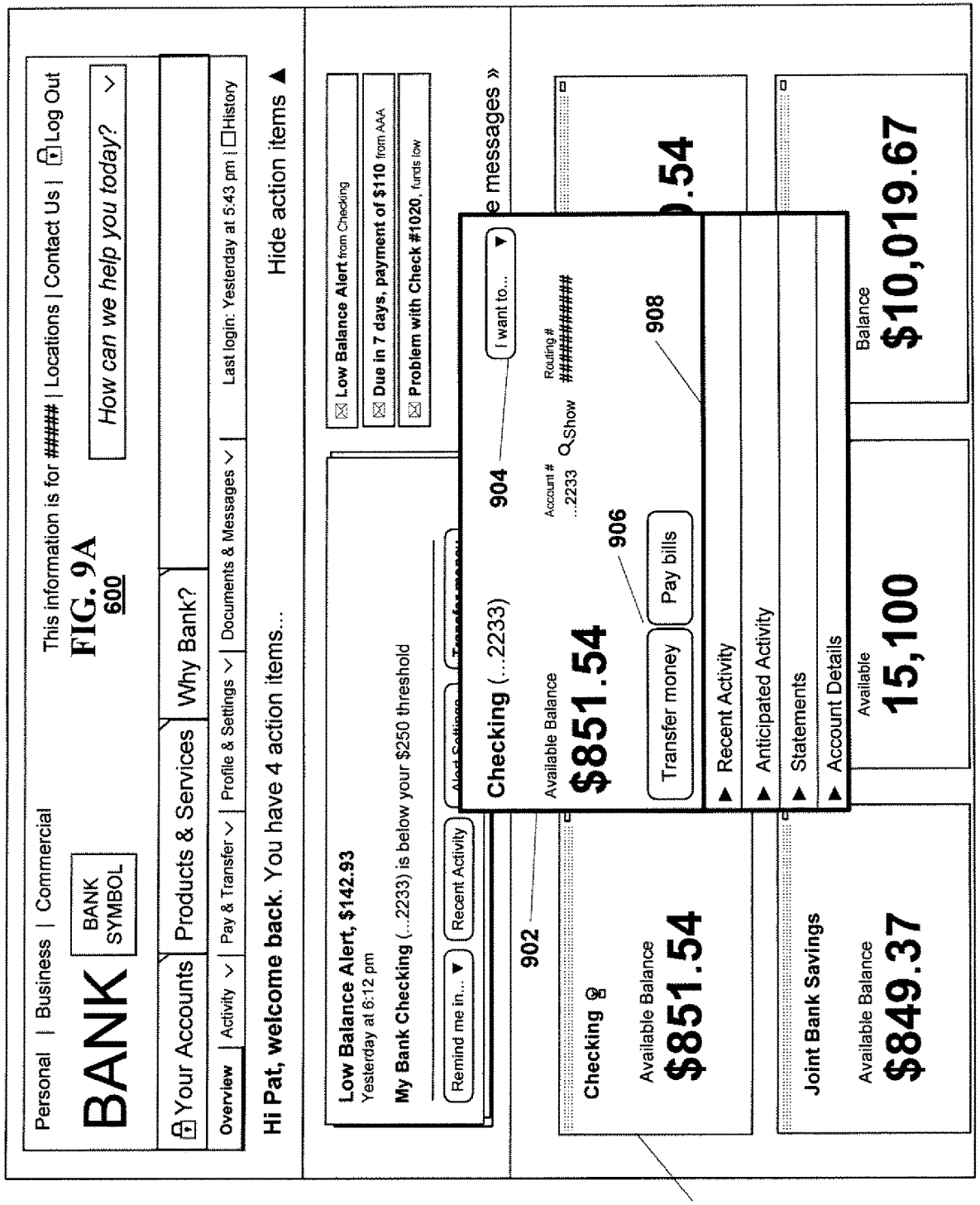
FIG. 9A is a depiction of a first embodiment of a pop-up account information window for a financial institution website according to exemplary embodiments.

FIG. 9A depicts a pop-up window 902 on the webpage 600. A described above, the webpage 600 may have the account information center 616. The account information center 616 may have a series of account information boxes 618a, etc. The account information boxes may provide further information when interacted with using the cursor. For example, the account information box 618a, when rolled over with the cursor (or in some embodiments, when clicked or otherwise actuated), may cause a pop-up window 902 to appear. The pop-up window 902 may contain information relating to the account identified in the account information box. The pop-up window may have a number of features. For example, the pop-up window may have an action selection menu 904, action buttons 906, and an information area 908. These features may each be related to the account shown. Thus, the features may differ depending on the account type. As depicted in FIG. 9A, the account is a checking account. This is meant to be exemplary and non-limiting however. Each of the features, such as 904, 906 and 908 may be selected based upon the most used customer actions for that type of account. In some embodiments, the user may be able to customize the appearance of the pop-up window 902, including the appearance thereof and the actions available in 906 and 908. The action selection menu 904 may contain all available actions to enable the user to perform actions even if not available at 906 or 908.

FIG. 9B depicts a pop-up window 910 on the webpage 600. The pop-up window 910 is for a different account than shown in FIG. 9A. The account information box 618b, when rolled over with the cursor (or in some embodiments, when clicked or otherwise actuated), may cause a pop-up window 910 to appear. The pop-up window 910 may contain information relating to the account identified in the account information box. The pop-up window may have a number of features. For example, the pop-up window may have an action selection menu 912, graph bar 914, an information area 916 and 918. These features may each be related to the account shown. Each of the features, such as 914, 916, and 918 may be selected based upon the most used customer actions for that type of account. In some embodiments, the user may be able to customize the appearance of the pop-up window 910, including the appearance thereof and the actions available in 914, 916, and 918. The action selection menu 912 may contain all available actions to enable the user to perform actions even if not available at 916 or 918.

Figure 9C:
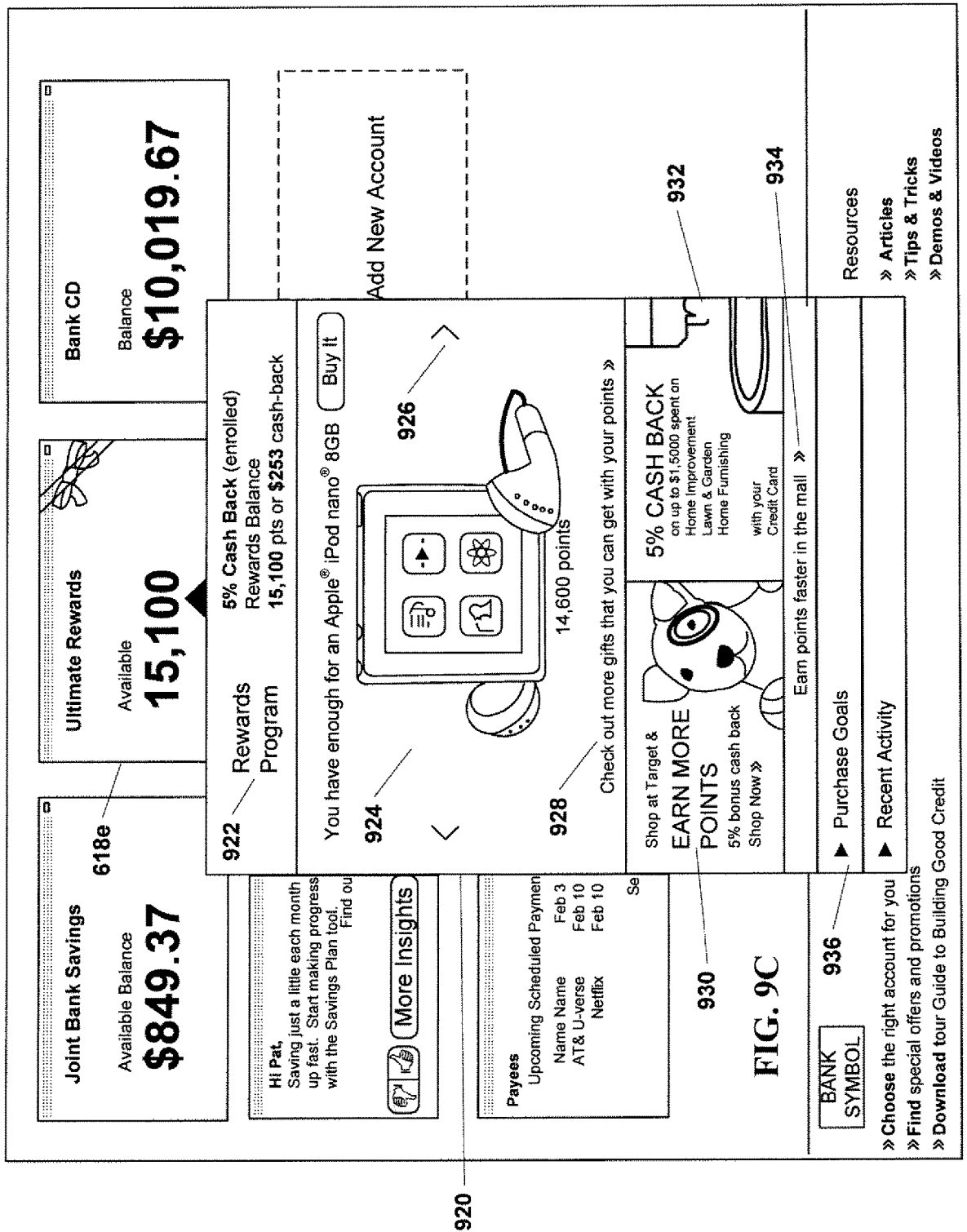
FIG. 9C is a depiction of a third embodiment of a pop-up account information window for a financial institution website according to exemplary embodiments.

FIG. 9C depicts a pop-up window 920 on the webpage 600. The pop-up window 920 is for a different account than shown in FIG. 9A or 9B. The account information box 618e, when rolled over with the cursor (or in some embodiments, when clicked or otherwise actuated), may cause a pop-up window 920 to appear. The pop-up window 920 may contain information relating to the account identified in the account information box. The pop-up window may have a number of features. In this example, the pop-up window 920 is related to a rewards account and thus may have differing features from a monetary or credit related account such as depicted above. For example, the pop-up window 920 may have an information area 922 describing the rewards account and the earned value status of the account. The pop-window may have a reward purchase section 924 to may allow the user to redeem their rewards points for merchandise or services. The reward purchase section 924 may present a tailored purchase option for the user. The tailored purchase option may be based upon information from the user, the balance of the rewards account, a profile of the user, and/or an analysis performed by the financial institution or a third party associated with the financial institution. For example, the purchase option, such as the mp3 player shown, may be based upon an item the user previously viewed in the rewards catalog. The user may be presented with options to scroll to additional items for purchase at 926, These additional options may also be tailored recommendations. The user may access a full range of options for purchase at 928.

At section 930, an advertisement and link to a merchant may be provided. This merchant may be a partner with the financial institution for the rewards program or the use of a particular credit card. The merchant may have other associations with the financial institution. The advertisement may be tailored to the user. For example, the user may shop or conduct a number of transactions with the merchant. In some embodiments, the section 930 may contain a sponsored ad from a merchant.

At section 932, another advertisement or link may be provided. This may be a tailored recommendation to the user. In some embodiments, this section 932 may be a sponsored ad or a link provided by the financial institution.

At section 934, an link to a shopping portal associated with the rewards program may be provided.

Section 936 may provide an information area with links to additional rewards program information related to the user's account.

Figure 9D:
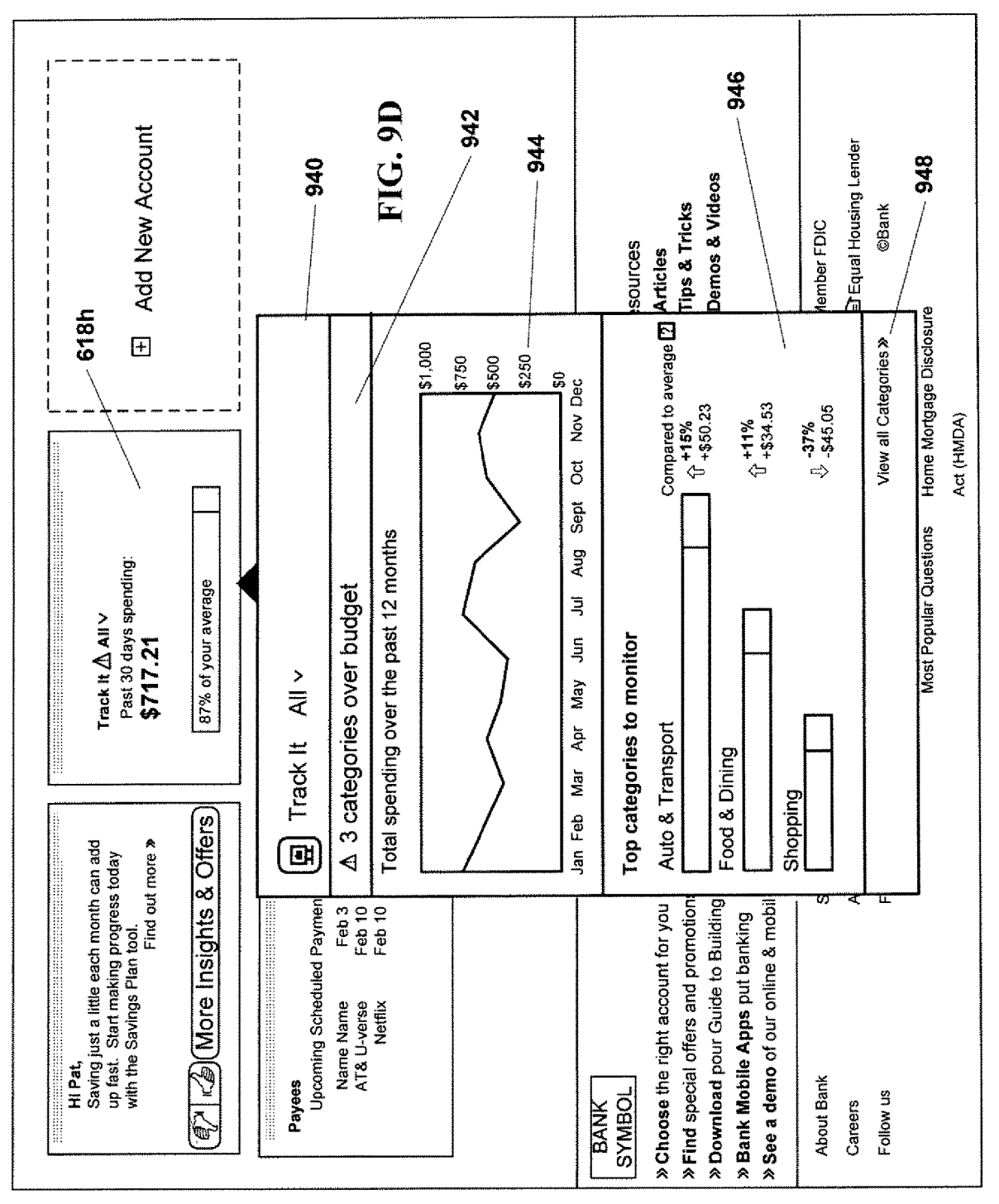

FIG. 9D depicts a pop-up window 920 on the webpage 600. The pop-up window 940 is for a different account than shown in FIG. 9A, 9B, or 9C. The account information box 618h, when rolled over with the cursor (or in some embodiments, when clicked or otherwise actuated), may cause a pop-up window 940 to appear. As depicted, the account information box 618h may relate to a spending management program associated with the financial institution. For example, the program may be named "Track It." This is meant to be non-limiting and exemplary. The pop-up window 940 may contain information relating to the Track It program. For example, the pop-up window 940 may have an alert section 942, a graphical tracking section 944, a bar graph monitoring section 946, and a category selection menu 948.

Figure 10:
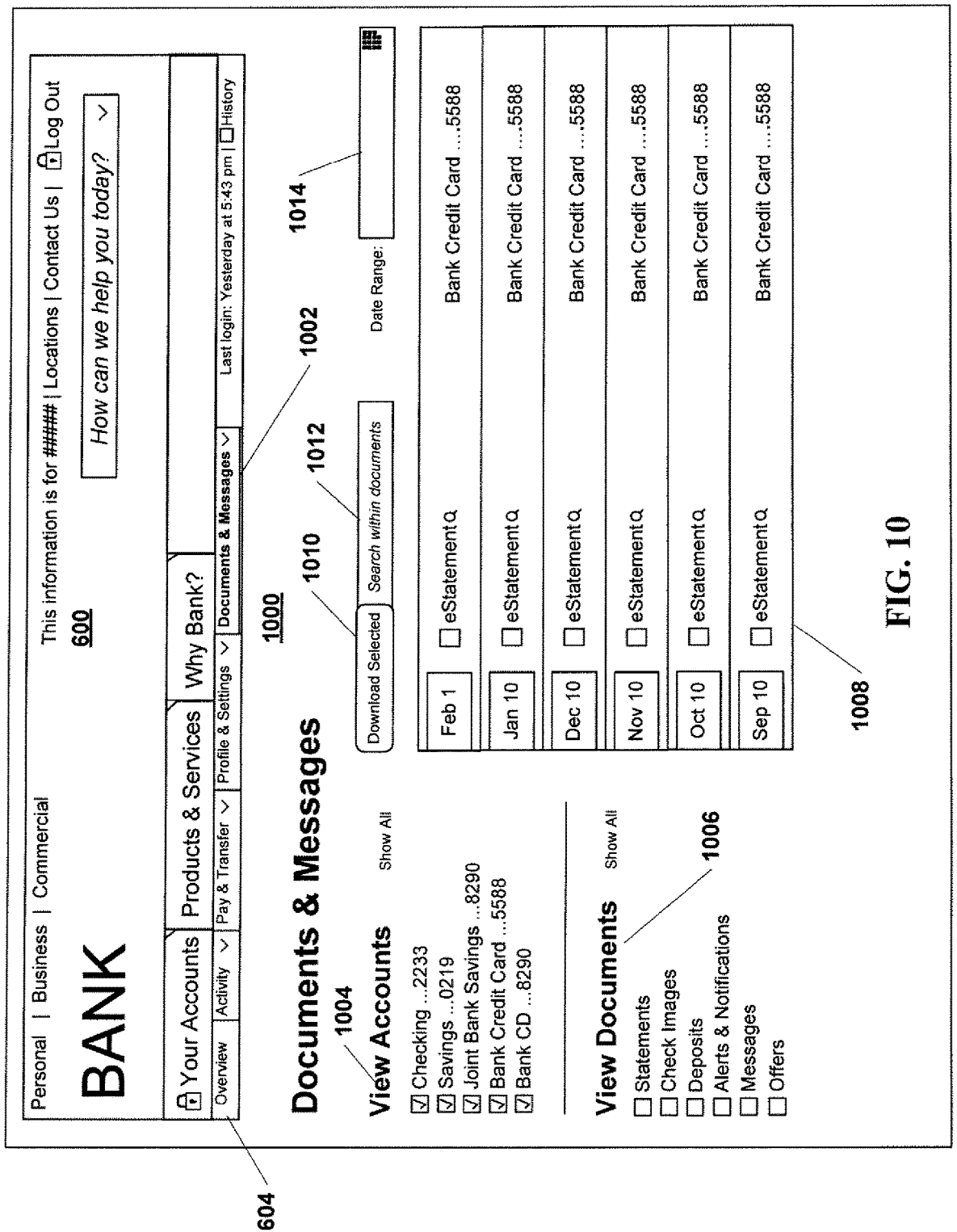
FIG. 10 is a depiction of a message center window for a financial institution website according to exemplary embodiments.

FIG. 10 depicts a messaging center window 1000 that is a part of the webpage 600. The messaging center window 1000 may be displayed following the selection of the menu item 1002 from the menu selections 604.

A view accounts filter 1004 may be provided. The view accounts filter 1004 may allow the messages to be filtered by account.

A view documents filter 1006 may be provided. The view documents filter 1006 may allow the messages to be filtered by document type. In some embodiments a combination of the view accounts filter 1004 and the view documents filter 1006 may be used to filter the messages by both an account and a document type.

A document and messages section 1008 displays the documents and messages present in the messaging center. As described above, the display may be filter to restrict its contents.

A download option 1010 allows a selected message or document to be downloaded to a designated location. The format of the downloaded item may be specified.

A search option 1012 may allow the search of the contents of the documents and message section 1008.

A date range filter 1014 may allow the documents and message section 1008 to be filtered by date. In some embodiments, a combination of the filters 1004, 1006, and 1014 may be used.

Hereinafter, aspects of implementation of the inventions will be described. As described above, the method of the invention may be computer implemented as a system. The system of the invention or portions of the system of the invention may be in the form of a "processing machine," for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The description of exemplary embodiments describes servers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

According to exemplary embodiments, the systems and methods may be computer implemented using one or more computers, incorporating computer processors. The computer implementation may include a combination of software and hardware. The computers may communicate over a computer based network. The computers may have software installed thereon configured to execute the methods of the exemplary embodiments. The software may be in the form of modules designed to cause a computer processor to execute specific tasks. The computers may be configured with hardware to execute specific tasks. As should be appreciated, a variety of computer based configurations are possible.

The processing machine described above may also utilize any of a wide variety of other technologies including a special purpose computer, a computer system including a microcomputer, mini-computer or mainframe for example, a programmed microprocessor, a micro-controller, a PICE (peripheral integrated circuit element), a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices for example capable of implementing the steps of the process of the invention.

It is appreciated that in order to practice the method of the invention as described above, it is not necessary that the processors and/or the memories of the processing machine be physically located in the same geographical place. For example, each of the processors and the memories and the data stores used in the invention may be located in geographically distinct locations and connected so as to communicate in any suitable manner. Additionally, it is appreciated that each of the processor and/or the memory and/or data stores may be composed of different physical pieces of equipment. Accordingly, it is not necessary that the processor be one single piece of equipment in one location and that the memory be another single piece of equipment in another location. For example, it is contemplated that the processor may be two or more pieces of equipment in two or more different physical locations. These two or more distinct pieces of equipment may be connected in any suitable manner. Additionally, the memory may include two or more portions of memory in two or more physical locations. Additionally, the data storage may include two or more components or two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions. It is also appreciated that the data storage performed by two distinct components as described above may, in accordance with a further embodiment of the invention, be performed by a single component. Further, the data storage performed by one distinct component as described above may be performed by two distinct components.

Further, various technologies may be used to provide communication between the various processors and/or memories, as well as to allow the processors and/or memories of the invention to communicate with any other entity; e.g., so as to obtain further instructions or to access and use remote memory stores, for example. Such technologies used to provide such communication might include a network, such as a computer network, for example, the Internet, Intranet, Extranet, LAN, or any client server system that provides communication of any capacity or bandwidth, for example. Such communications technologies may use any suitable protocol such as TCP/IP, UDP, or OSI, for example. It should be appreciated that examples of computer networks used in the preceding description of exemplary embodiments, such as the Internet, are meant to be non-limiting and exemplary in nature.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming or any other suitable programming form. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments of the invention. Illustratively, the programming language used may include assembly language, Ada, APL, Basic, C, C++, C #, COBOL, dBase, Forth, Fortran, Java, Modula-2, Pascal, Prolog, REXX, Ruby, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, e.g., the software for example, that enables the computer operating system to perform the operations described above may be contained on any of a wide variety of computer readable media, as desired. Further, the data for example processed by the set of instructions might also be contained on any of a wide variety of media or medium. For example, the particular medium, e.g., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

While the embodiments have been particularly shown and described within the framework of financial services and websites, it will be appreciated that variations and modifications may be effected by a person of ordinary skill in the art without departing from the scope of the invention. Furthermore, one of ordinary skill in the art will recognize that such processes and systems do not need to be restricted to the specific embodiments described herein. Other embodiments, combinations of the present embodiments, and uses and advantages of the present invention will be apparent to those skilled in the art from consideration of the specification and practice of the invention disclosed herein. The specification and examples should be considered exemplary.

What is claimed is:

1. A system, comprising:
    a server comprising at least one processor; and
    a memory comprising computer-readable instructions which when executed by the at least one processor cause the at least one processor to perform the steps comprising:
        receiving a first request from a computer terminal by a user for a first webpage;
        providing the first webpage which comprises a homepage with a section for input of login information associated with the user;
        receiving the login information from the first webpage, the login information comprising two or more of a user name, a user password, card based login information, and biometrics;
        validating the login information associated with the user;
        providing a secure webpage following validation of the login information, the secure webpage differing from the first webpage and containing confidential, non-public information, the secure webpage also including a customized appearance wherein the customized appearance is one of an appearance defined by user selected choices and an appearance automatically created by the system based on the user's historical usage of the website;
        receiving a logout request from the secure webpage;
        receiving a second request from the computer terminal for the first webpage, wherein the system identifies the second request by the presence of one or more cookies on the user's computing device; and
        providing a second webpage comprising a modified homepage in response to the second request from the computer terminal, wherein the modified homepage comprises a section requiring a subset of the login information wherein the subset of login information comprises a password, and where the modified homepage contains a customized user appearance including an identification of the user.

2. The system of claim 1, wherein the computing device is a computer terminal.

3. The system of claim 1, wherein the computing device is a portable electronic device.

4. The system of claim 1, further comprising:
    receiving the subset of the login information.

5. The system of claim 4, further comprising:
    validating the subset of the login information; and
    providing the secure webpage following a successful validation of the subset of the login information.

6. The system of claim 4, further comprising:
    validating the subset of the login information; and
    providing the first webpage upon a failed validation of the subset of the login information.

7. The system of claim 1, further comprising:
    providing a display on the secure webpage comprising account information associated with the user, the display comprising a matrix comprising a plurality of boxes containing the account information.

8. The system of claim 1, wherein being customizable comprises allowing the user to arrange the layout of the plurality of boxes and the account information displayed in each of the plurality of boxes.

9. The system of claim 7, further comprising:
providing a pop-up window from each of the plurality of boxes that contains further information related to the account and the pop-up window is provided when a selection cursor is moved over top of the box.

10. A method, comprising:
receiving a first request from a computer terminal by a user for a first webpage;
providing, by at least one computer processor, the first webpage which comprises a homepage with a section for input of login information associated with the user;
receiving the login information from the first webpage, the login information comprising two or more of a user name, a user password, card based login information, and biometrics;
validating the login information associated with the user;
providing, by the at least one computer processor, a secure webpage following validation of the login information, the secure webpage differing from the first webpage and containing confidential, non-public information, the secure webpage also including a customized appearance wherein the customized appearance is one of an appearance defined by user selected choices and an appearance automatically created by the system based on the user's historical usage of the website;
receiving a logout request from the secure webpage;
receiving a second request from the computer terminal for the first webpage, wherein the system identifies the second request by the presence of one or more cookies on the user's computing device; and
providing, by the at least one computer processor, a second webpage comprising a modified homepage in response to the second request from the computer terminal, wherein the modified homepage comprises a section requiring a subset of the login information wherein the subset of login information comprises a password, and where the modified homepage contains a customized user appearance including an identification of the user.

11. The method of claim 10, wherein the computing device is a computer terminal.

12. The method of claim 10, wherein the computing device is a portable electronic device.

13. The method of claim 10, further comprising:
receiving the subset of the login information.

14. The method of claim 13, further comprising:
validating, by the at least one computer processor, the subset of the login information; and
providing, by the at least one computer processor, the secure webpage following a successful validation of the subset of the login information.

15. The method of claim 13, further comprising:
validating, by the at least one computer processor, the subset of the login information; and
providing, by the at least one computer processor, the first webpage upon a failed validation of the subset of the login information.

16. The method of claim 10, further comprising:
providing, by the at least one computer processor, a display on the secure webpage comprising account information associated with the user, the display comprising a matrix comprising a plurality of boxes containing the account information.

17. The method of claim 10, wherein being customizable comprises allowing the user to arrange the layout of the plurality of boxes and the account information displayed in each of the plurality of boxes.

18. The method of claim 16, further comprising:
providing, by the at least one computer processor, a pop-up window from each of the plurality of boxes that contains further information related to the account and the pop-up window is provided when a selection cursor is moved over top of the box.

* * * * *